(12) United States Patent
Yonehana et al.

(10) Patent No.: US 7,210,550 B2
(45) Date of Patent: May 1, 2007

(54) UNDER-SEAT STRUCTURE FOR A MOTORCYCLE

(75) Inventors: Atsushi Yonehana, Saitama (JP); Masao Ogawa, Saitama (JP); Yutaka Murata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 279 days.

(21) Appl. No.: 10/832,337

(22) Filed: Apr. 27, 2004

(65) Prior Publication Data

US 2004/0238253 A1    Dec. 2, 2004

(30) Foreign Application Priority Data

May 30, 2003   (JP)   .............................. 2003-155505
May 30, 2003   (JP)   .............................. 2003-155596
May 30, 2003   (JP)   .............................. 2003-155904

(51) Int. Cl.
*B60K 1/00*   (2006.01)

(52) U.S. Cl. ...................................... 180/220; 180/65.1

(58) Field of Classification Search ................ 180/220, 180/216, 65.1, 68.4, 205–207; 224/413, 224/427, 436
See application file for complete search history.

(56) References Cited

U.S. PATENT DOCUMENTS

| | | | | |
|---|---|---|---|---|
| 4,030,562 | A | * | 6/1977 | Leighton et al. ............. 180/206 |
| 5,190,345 | A | * | 3/1993 | Lin ......................... 297/188.12 |
| 5,524,726 | A | * | 6/1996 | Wright, Jr. ................... 180/220 |
| 5,573,163 | A |   | 11/1996 | Lee et al. |
| 6,155,369 | A | * | 12/2000 | Whittaker .................... 180/220 |
| 2003/0051934 | A1 | * | 3/2003 | Ou .............................. 180/220 |
| 2003/0080535 | A1 |   | 5/2003 | Kurohori et al. |
| 2004/0069549 | A1 | * | 4/2004 | Ono et al. ................. 180/65.8 |

FOREIGN PATENT DOCUMENTS

| | | |
|---|---|---|
| EP | 0 608 841 A1 | 8/1994 |
| EP | 0 741 060 A2 | 11/1996 |
| EP | 0 741 441 A2 | 11/1996 |
| EP | 0 902 523 A1 | 3/1999 |
| JP | 5-105149 * | 4/1993 |
| JP | 5-278670 * | 10/1993 |
| JP | 6-141407 A | 5/1994 |
| JP | 6-278667 A | 10/1994 |
| JP | 3343361 B2 | 8/2002 |
| JP | 2002-284064 A | 10/2002 |

* cited by examiner

*Primary Examiner*—Anne Marie Boehler
(74) *Attorney, Agent, or Firm*—Birch Stewart Kolasch & Birch, LLP

(57) ABSTRACT

A motorcycle with a seat frame and seat attached to a seat post. The seat frame is covered with the seat as viewed from above and is structured so as to hold an article in an exposed state thereon to form an article accommodating space below the seat. The rear wheel of the motorcycle is driven by a motor to which power is supplied from a battery. The voltage of the battery is converted by a charging and voltage conversion section to supply power to electrical equipment. The charging and voltage conversion section is attached in an exposed state to a vehicle body frame. A battery for supplying power to a motor is provided with a charging and voltage conversion apparatus for charging the battery. A charging cable for energizing the charging and voltage conversion apparatus is disposed in a hollow portion of a vehicle body frame.

18 Claims, 21 Drawing Sheets

UNDER-SEAT STRUCTURE FOR A MOTORCYCLE

CROSS-REFERENCE TO RELATED APPLICATIONS

The present application claims priority under 35 USC 119 to Japanese Patent Application Nos. 2003-155505; 2003-155904 and 2003-155596 all filed on May 30, 2003 the entire contents thereof are hereby incorporated by reference.

BACKGROUND OF THE INVENTION

1. Field of the Invention

This invention relates to an under-seat structure for a motorcycle, and more particularly to a seat post and a structure around the seat post. In addition, the invention relates to a motor-driven vehicle including a voltage conversion section. Further, the invention relates to a motor-driven vehicle including a charger and a charging cable.

2. Description of Background Art

An under-seat structure for a motorcycle is known wherein a supporting member in the form of a frame for attaching a seat is attached to a rear frame of the motorcycle. See, Japanese Patent Laid-open No. 2002-284064, Pages 3 to 4 and FIG. 2.

FIG. 2 of Japanese Patent Laid-open No. 2002-284064 is described with reference to FIG. 19 in the drawings. It is to be noted that reference numerals are re-applied.

FIG. 19 is a side elevational view of a conventional under-seat structure for a motorcycle wherein a scaffold-like supporting member 303 is attached to a rear frame 302 of the motorcycle 301 and a seat 304 is attached to an upper portion of the supporting member 303 while an article accommodating space 306 for accommodating an elongated accommodation object is formed below the seat 304. An accommodation section 308 is provided on the bottom plate, which forms the bottom of the article accommodating space 306.

When an article is placed on the article accommodating section bottom plate 308 in order to accommodate the article in the article accommodating space 306, if it rains, then the article becomes wet with the rain. Therefore, it is possible to attach side walls to the supporting member 303 to cover all sides of the article accommodating space 306 so that the article may not become wet. This, however, requires an increased number of parts and therefore makes the structure complicated and increases the weight as well. Further, it becomes less easy to take out the article from within the article accommodating space 306 and the convenience in use deteriorates. In addition, if the structure for providing a novel impression of the article accommodating space 306, which does not include partition walls from the outside, is eliminated, then this is not preferable also from the point of view as an improvement in the marketability of the structure as a commodity.

In addition, an under-seat structure for a motorcycle is known wherein a supporting member in the form of a frame for attaching a seat is attached to a rear frame See, Japanese Patent Laid-open No. Hei 6-278667, Page 4 and FIG. 10)

FIG. 10 of Japanese Patent Laid-open No. Hei 6-278667 is described with reference to FIG. 20 in the drawings. It is to be noted that reference numerals are re-applied.

FIG. 20 is a side elevational view of a conventional motor-driven vehicle wherein a large size accommodation section 302 is attached to a rear frame 301 and a seat 303 is attached to an upper portion of the large size accommodation section 302. Further, the outer periphery of the large size accommodation section 302 is covered with a rear cover assembly 304, and a DC-DC converter 306 is disposed rearwardly of the large size accommodation section 302 within the rear cover assembly 304.

Further, a charging port for a motor-driven vehicle is known wherein the charging port is provided in an accommodation box. See, Japanese Patent No. 3343361, Pages 2 to 4 and FIG. 1.

FIG. 1 of Japanese Patent No. 3343361 is described below with reference to FIG. 21. It is to be noted that reference numerals are re-applied.

FIG. 21 is a side elevational view of a conventional motor-driven vehicle wherein a motor-driven two-wheeled vehicle 306 includes an accommodation box 302 and another accommodation box 303 provided integrally with the accommodation box 302. The boxes are attached to a rear frame 301 and a charging port 304 is disposed in the accommodation box 303. A partition wall 307 is provided for partitioning the accommodation box 302 and the accommodation box 303 from each other.

SUMMARY AND OBJECTS OF THE INVENTION

It is an object of the present invention to improve an under-seat structure for a motorcycle to eliminate a special water strip to suppress an increase in the number of parts and the weight to achieve a simplified structure in terms of the accommodation for improving the convenience in use and for achieving a further enhancement of the marketability of the motorcycle as a commodity.

It is noted that the DC-DC converter 306 generates heats upon its operation. When it is disposed within the rear cover assembly 304, it is considered that the heat may not be radiated sufficiently.

Since the removal and the attachment of the rear cover assembly 304 are involved in the assembly or maintenance of the DC-DC converter 306, it is desired to improve the assembling property and the maintenance property.

Therefore, it is an object of the present invention to improve a motor-driven vehicle to raise the radiation property of heat from a voltage section and to achieve improvements in the assembly property and the maintenance property.

In the technique described above, since the accommodation box 303 is provided in order to accommodate the charging port 304 therein, a part such as the partition wall 307 is additionally provided and the accommodation space of the accommodation box 302 is reduced. This is not preferable in terms of the effective utilization of the space for the vehicle body.

Further, where a charging port is provided on a vehicle that does not include an accommodation box, it is desired to utilize a space of the vehicle body, which is not used.

Therefore, it is an object of the present invention to improve a motor-driven vehicle to suppress an increase in the number of parts for disposing a charging cable for a charger and to achieve effective utilization of a space for the vehicle body.

In order to attain the objects described above, according to the present invention, an under-seat structure for a motorcycle is provided wherein a seat frame is attached to a seat post and a seat is attached to the seat frame wherein the seat frame is covered with the seat as viewed from above and is structured so as to hold an article in an exposing state on the seat frame thereby to form an article accommodating space below the seat.

Since the seat frame is covered with the seat and is structured so as to hold an article in an exposed state thereon, an article can be accommodated immediately below the seat. Thus, the article accommodated in the article accommodating space does not become wet with rain even if a cover or the like is not provided sidewardly of the article accommodating space. Consequently, the necessity for a special structure for preventing an article accommodated in the article accommodating space from becoming wet with rain is eliminated. In addition to the structure described, since the under-seat structure is a simple structure that the seat frame and the seat are attached to the seat post, the number of parts can be reduced which results in a reduction of the weight.

Further, where the article is, for example, a helmet, if the helmet is retained on the seat frame, then a novel appearance is obtained wherein it does not look at a glance that a helmet is accommodated below the seat. Consequently, the appearance is improved. In addition, an improvement in the marketability of the motorcycle can be achieved.

Furthermore, if the seat is formed as a seat of an opening and closing type, then if the seat is opened, then the helmet can be simply taken out, and the convenience of use can be improved when an article is accommodated in the storage area.

According to the present invention, the under-seat structure for a motorcycle includes a charger for charging a battery that is disposed at a lower portion of the article accommodating space and is attached to the seat post through a supporting member. A charging cable is provided for energizing the charger and is disposed in the seat post such that an end of the charging cable can be taken out from an upper end of the seat post.

Where the charger and the charging cable are disposed in dead spaces, which appear around the seat post and in the inside of the seat post, the space of the motorcycle can be utilized effectively.

According to the present invention, the under-seat structure for a motorcycle includes the charger that is disposed closely to the seat post.

Where the charger is disposed closely to the seat post, the charging cable can be formed with a reduced length. Thus, a reduction in the weight can be anticipated.

The DC-DC converter 306 generates heat upon its operation, and where it is disposed within the rear cover assembly 304 as described above, the heat may not be radiated sufficiently.

Further, since removal and attachment of the rear cover assembly 304 are involved in the assembly or maintenance of the DC-DC converter 306, it is desired to improve the assembling property and the maintenance property.

Therefore, it is an object of the present invention to improve a motor-driven vehicle to raise the radiation property of heat from a voltage conversion section and achieve an improvement in the assembly property and the maintenance property.

In order to attain the object described above, according to the present invention, a motor-driven vehicle is provided wherein a wheel is driven by a motor to which power is supplied from a battery and the voltage of the battery is converted by a voltage conversion section to supply power to electrical equipment such as a lamp. The motor-driven vehicle includes a voltage conversion section that is attached thereto in an exposed state.

Since the voltage conversion section is provided in an exposed state, for example, when compared with an alternative motor-driven vehicle wherein a voltage conversion section is provided in a vehicle body cover, heat generated by the voltage conversion section can be radiated readily and a temperature rise of the voltage conversion section can be suppressed.

Further, since the voltage conversion apparatus is in an exposed state, the assembly and maintenance thereof are facilitated. Thus, the assembling property and the maintenance property can be improved.

According to the present invention, the motor-driven vehicle includes a seat that is attached to an upper portion of a vehicle body frame such that an exposing space is provided below the seat, and the voltage conversion section is disposed in the space.

Thanks to the space below the seat, the voltage conversion section is likely to be exposed to ambient air when the vehicle is operated. Consequently, the voltage conversion section can be cooled effectively with the ambient air.

Further, since the space below the seat is utilized to dispose the voltage conversion section, the space of the vehicle body can be utilized effectively.

According to the present invention, the motor-driven vehicle includes the voltage conversion section and the electrical equipment is disposed closely to each other.

Since the voltage conversion section and the electric equipment are disposed closely to each other, the distance over which the voltage conversion section and the electric equipment are connected to each other by a lead can be shortened, and electric influences such as the loss by the resistance and noise can be reduced.

According to the present invention, the motor-driven vehicle includes cooling fins that are provided on the voltage conversion section in such a manner as to extend downwardly.

Since the cooling fins are provided on the voltage conversion section in such a manner as to extend downwardly, the cooling efficiency of the voltage conversion section can be improved. Further, according to the present invention, rainwater or dust can be prevented from collecting between the cooling fins as in a case wherein such cooling fins are provided, for example, at an upper portion of the voltage conversion section.

In order to attain the object described above, according to the present invention, a motor-driven vehicle including a battery for supplying power to a motor, a charger for charging the battery, and a charging cable for energizing the charger includes a charging cable that is disposed in a hollow portion of a vehicle body frame forming the motor-driven vehicle.

Since the charging cable is disposed in the hollow portion of the vehicle body frame, there is no necessity to provide a member specially for accommodating the charging cable. Besides, a dead space in the vehicle body frame can be utilized effectively.

According to the present invention, the motor-driven vehicle includes the charging cable that is accommodated in a seat post forming the vehicle body frame, and an opening for taking out the charging cable therethrough is provided at an upper end of the seat post and a seat is attached for an opening and closing movement to the upper end of the seat post such that the opening is covered with the seat in the closed state.

The charging cable and the opening of the seat post can be covered with the seat, and there is no possibility that the charging cable may become wet or rainwater may enter the opening. Further, since the opening is provided at the upper end of the seat post, it is easy to take out the charging cable upwardly. Furthermore, since the seat can be used commonly as a lid for the accommodating space formed below the seat and as a taking out port for the charging cable, the number of parts is reduced with a reduction in the cost.

According to the present invention, the motor-driven vehicle includes the charger that is disposed closely to the seat post.

Since the charger is disposed closely to the seat post, the charging cable can be formed short to reduce the weight. Further, since the electric resistance of the charging cable is reduced, there is an effect that the charging efficiency is improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the present invention are described below with reference to the accompanying drawings.

Figure 1:
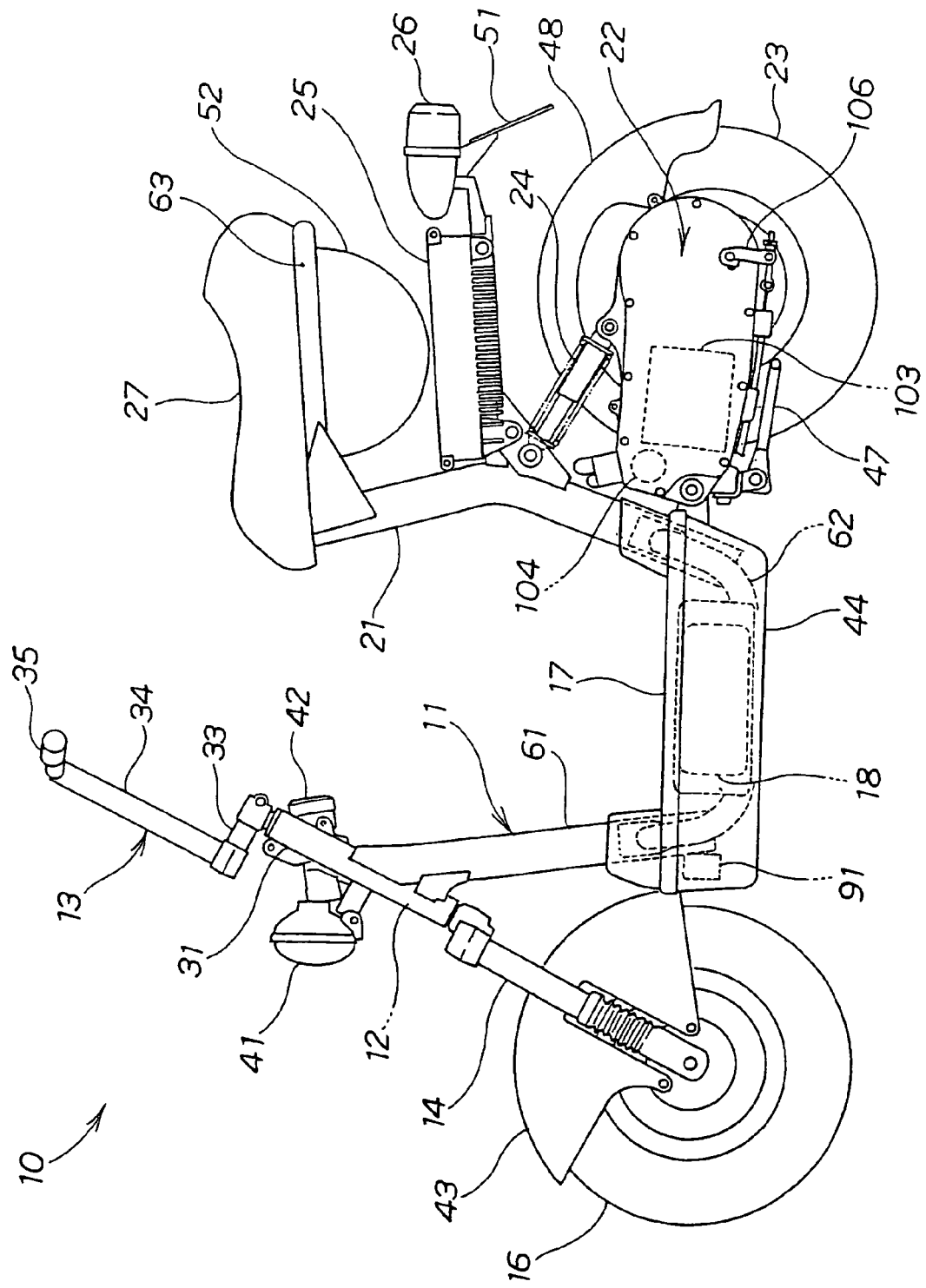
FIG. 1 is a side elevational view of a motor-driven vehicle according to the present invention.

FIG. 1 is a side elevational view of a motorcycle according to the present invention. The motor-driven vehicle 10 as a motorcycle includes a steering shaft 12 attached for rotation at a front portion of a vehicle body frame 11 with a steering member 13 attached to an upper portion of the steering shaft 12. A front fork 14 is attached to a lower portion of the steering shaft 12 with a front wheel 16 attached to a lower end of the front fork 14. The motor-driven vehicle 10 further includes a floor step 17 provided at a middle portion of the vehicle body frame 11 with a pair of batteries 18, 18 (only the reference numeral 18 on this side is shown) disposed below the floor step 17. A power unit 22 of the swing type is attached for upward and downward swinging motion at a lower portion of a seat post 21 which forms a rear portion of the vehicle body frame 11. A rear wheel 23 is attached to a rear portion of the power unit 22. The motor-driven vehicle 10 further includes a rear cushion unit 24 extending between an upper portion of the power unit 22 and the seat post 21 side with a charging and voltage conversion apparatus 25 attached to an intermediate portion of the seat post 21 and serving as a charger. A tail lamp 26 is disposed rearwardly of the charging and voltage conversion apparatus 25 with a seat 27 attached to an upper end portion of the seat post 21.

The vehicle body frame 11 includes a head pipe 31 provided at a front portion thereof for supporting the steering shaft 12 for rotation.

The steering member 13 includes an arm 33 attached to an upper end portion of the steering shaft 12 with a handle bar supporting member 34 extending upwardly from the arm 33. A handle bar member 35 is attached to an upper portion of the handle bar supporting member 34. Since the steering member 13 includes the handle bar supporting member 34, the head pipe 31 can be disposed at a low position. Thus, the vehicle body frame 11 can be formed to be small in size, and the weight of the vehicle body frame 11 can be reduced.

Each of the batteries 18 includes a plurality of column-shaped battery cells, which are packed in a shrink pack, a packaging material, which packs as it shrinks by heat.

The charging and voltage conversion apparatus 25 includes a charger for rectifying a commercial power supply into DC current of a predetermined lowered voltage and supplying the current of the lowered voltage to the batteries 18. A DC-DC converter is provided for converting a battery voltage raised to a high voltage for driving the motor into a low voltage for electrical equipment such as the tail lamp.

In particular, the charging and voltage conversion apparatus 25 is formed as a unitary member from a charger and a DC-DC converter. It is to be noted that, while the charging and voltage conversion apparatus 25 in the present embodiment is hereinafter described as a unitary type of a charger and a DC-DC converter, naturally the charger and the DC-DC converter may be formed as separate members from each other. For example, the charger may be disposed in the proximity of the batteries 18 while the DC-DC converter is disposed in the proximity of the electrical equipment such as the tail lamp.

A head lamp 41 and a main switch 42 are attached to a front portion of the vehicle body frame 11. A front fender 43 is provided for covering the front wheel 16, with an under cover 44 for covering below the floor step 17. A side stand 47 is attached to the body frame 11 with a rear fender 48 for covering over the rear wheel 23. A license plate 51 is attached to a lower portion of the tail lamp 26. A helmet 52 is accommodated below the seat 27.

Figure 2:
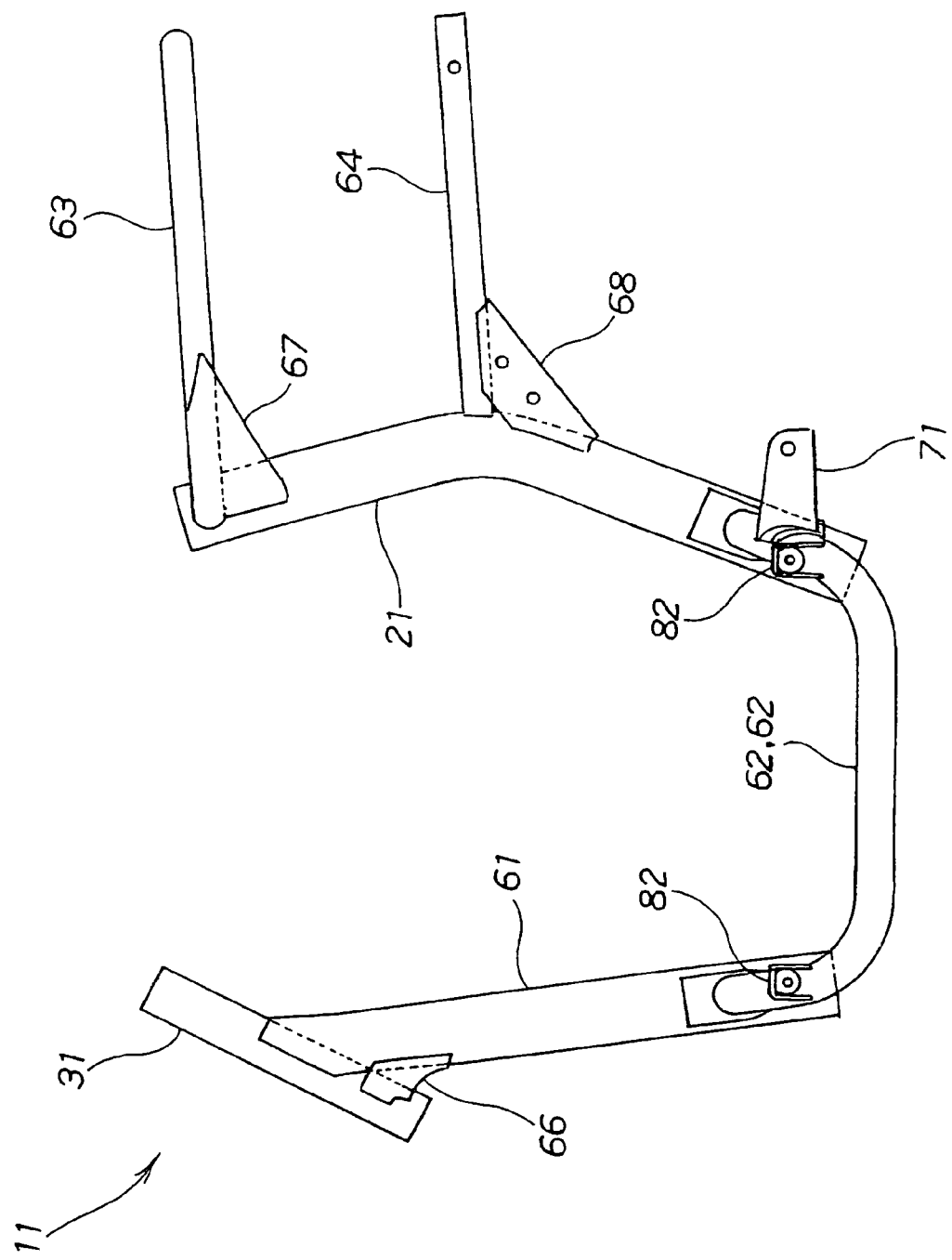
FIG. 2 is a side elevational view of a vehicle body frame of the motor-driven vehicle according to the present invention.

FIG. 2 is a side elevational view showing the body frame of the motor-driven vehicle according to the present invention. The vehicle body frame 11 includes the head pipe 31 described hereinabove, a down pipe 61 extending substantially straightforwardly downwards from the head pipe 31, and a pair of left and right lower pipes 62, 62 extending downwardly, rearwardly, and then upwardly from the down pipe 61. The vehicle body frame 11 further includes the aforementioned seat post 21 attached to the lower pipes 62, 62 and having an L-shape. A seat frame 63 extends rearwardly from an upper end portion of the seat post 21 with an intermediate frame 64 as a supporting member extending rearwardly from an intermediate portion of the seat post 21. It is to be noted that reinforcement members 66, 66, 67, 67, 68, and 68 (only those reference numerals 66, 67, and 68 on this side are shown) are provided together with a power unit supporting member 71 attached to a lower end portion of the seat post 21 for attaching the swing shaft of the power unit 22. See, FIG. 1.

Since the head pipe 31, down pipe 61, lower pipes 62, 62 and seat post 21 of the vehicle body frame 11 have such a configuration as described above and are formed in a substantially U shape, the vehicle body frame 11 is simple in structure while it functions as necessary for the motor-driven vehicle 10 wherein the steering member 13 and the seat 27 are supported at an end portion of the U shape and the floor step 17 is supported on and the batteries 18 are accommodated in the bottom of the U shape.

Figure 3:
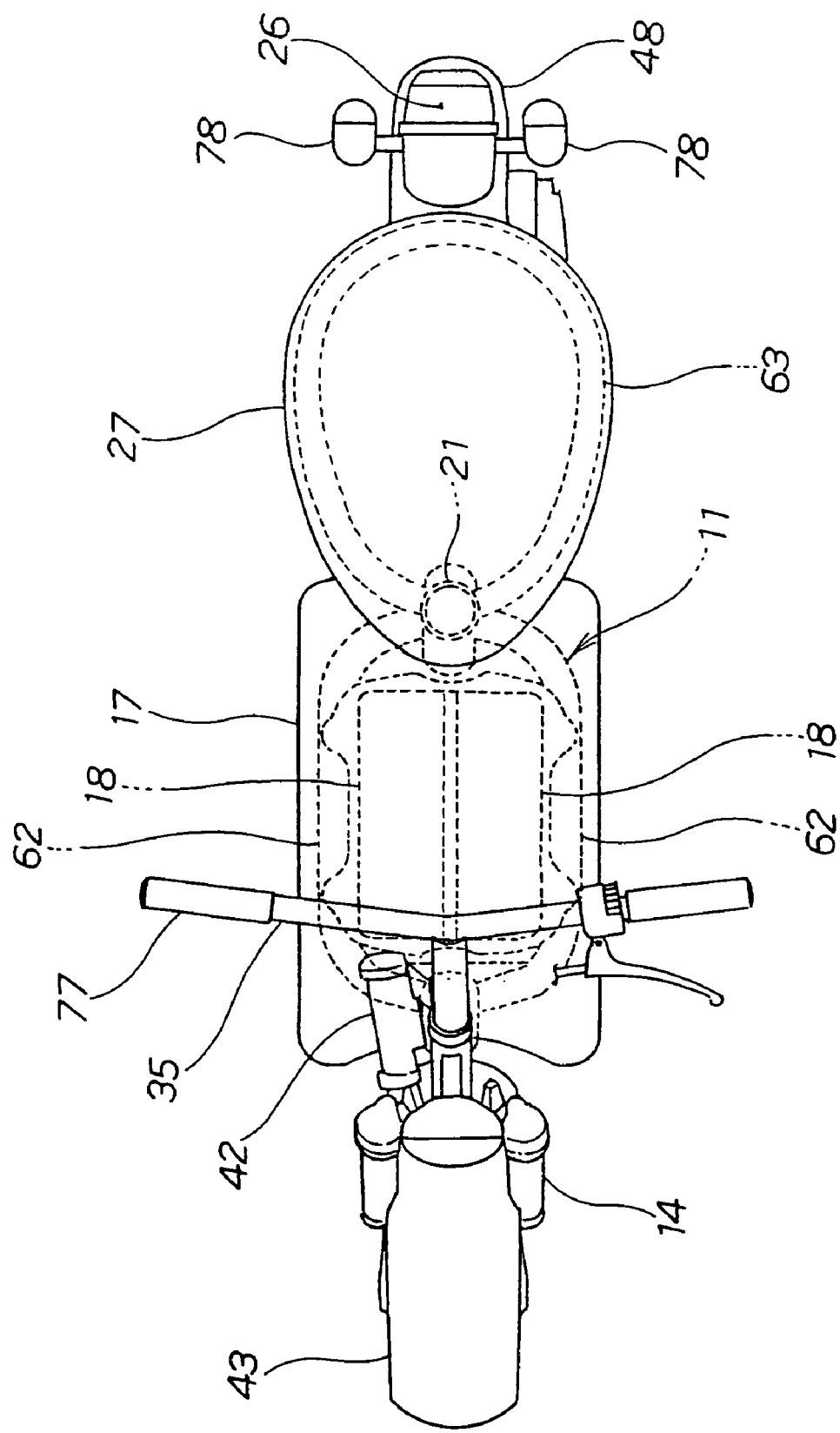
FIG. 3 is a plan view of the motor-driven vehicle according to the present invention.

FIG. 3 is a plan view of the motor-driven vehicle according to the present invention wherein the lower pipes 62, 62 of the vehicle body frame 11 are disposed below the floor step 17 of a substantially quadrangular shape and the batteries 18, 18 are disposed in a juxtaposed relationship between the lower pipes 62, 62. A grip 77 is provided for adjusting the output power of the motor (hereinafter described). Winkers 78, 78 are attached to the left and the right of the tail lamp 26. Each of the grips 77 may be formed as a member of the type for use with an ordinary motorcycle or the like wherein the grip itself is gripped and rotated or as a member (thumb throttle) of the lever type for use with an ATV (All Terrain Vehicle: vehicle for traveling on a rough road).

Figure 4:
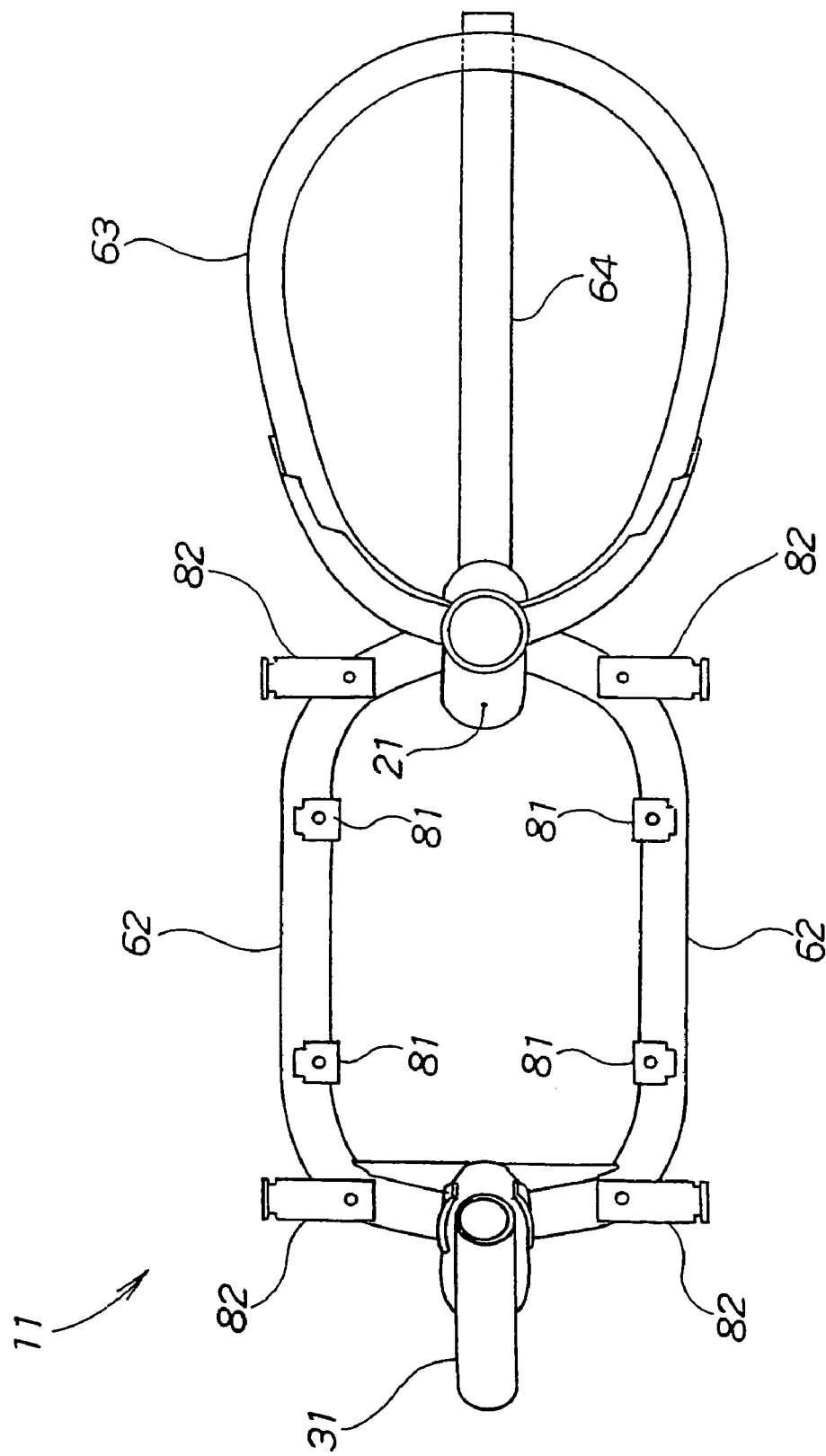
FIG. 4 is a plan view showing a vehicle body frame of the motor-driven vehicle according to the present invention.

FIG. 4 is a plan view showing the vehicle body frame of the motor-driven vehicle according to the present invention wherein the seat frame 63 of the vehicle body frame 11 has a circular shape, an elliptical shape, or a like shape such that an edge of the helmet 52, see FIG. 1, can be hung on the inner side of the seat frame 63 so that the helmet 52 can be held by the seat frame 63. First brackets 81, . . . ( . . . represents a plural number. This similarly applies to the following description) are attached to the lower pipes 62, 62 for securing the floor step 17, see FIG. 3, to the lower pipes 62, 62, and 82, . . . second brackets are attached to the lower pipes 62, 62 for securing the floor step 17 and the under cover 44, see FIG. 1, to the lower pipes 62, 62.

Figure 5:
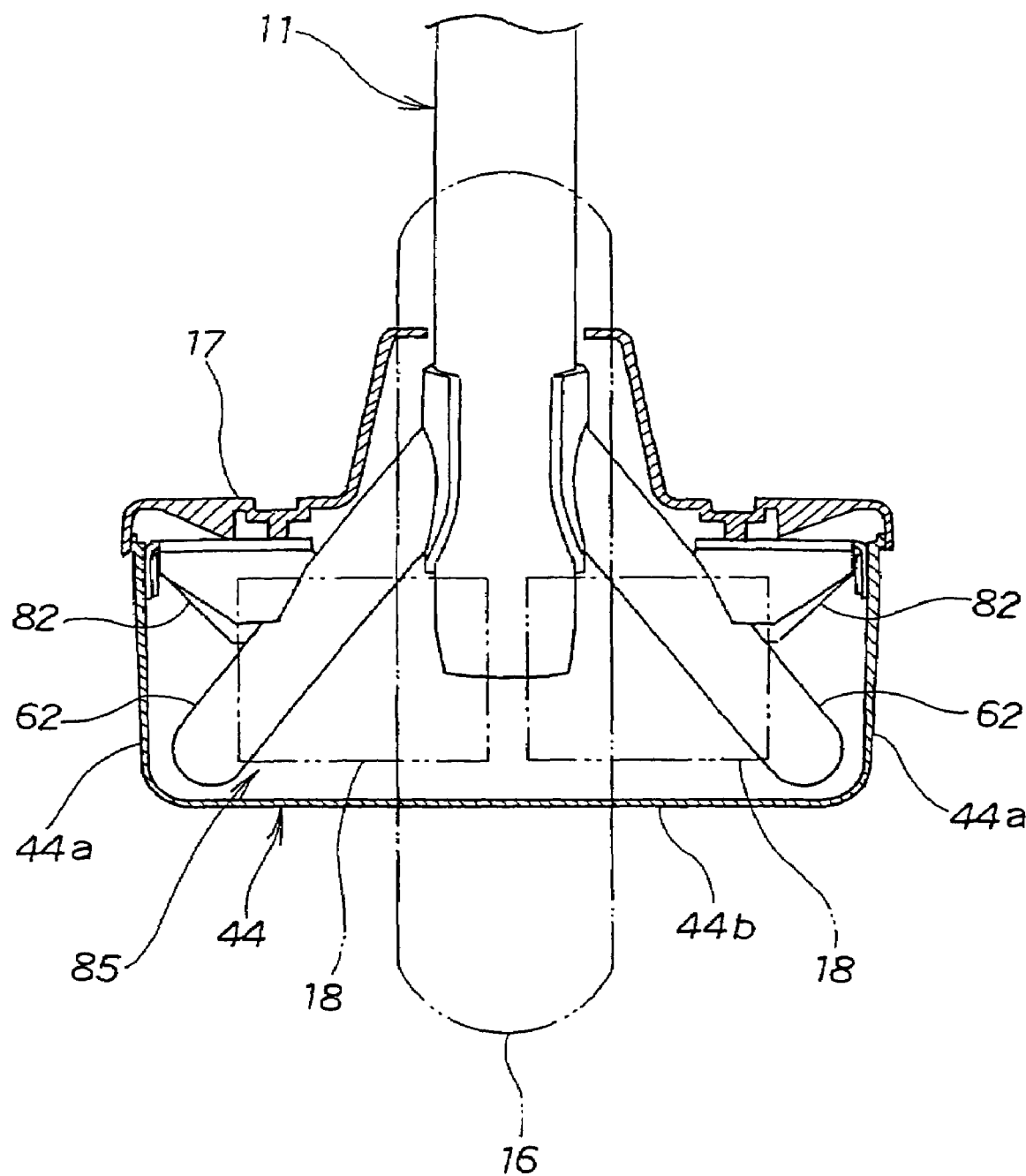
FIG. 5 is a sectional view showing a front portion of the vehicle body frame according to the present invention and a floor step.

FIG. 5 is a sectional view showing a front portion of the vehicle body frame according to the present invention wherein the floor step and the second brackets 82, 82 are attached to the lower pipes 62, 62 of the vehicle body frame 11 while the floor step 17 is attached to upper portions of the second brackets 82, 82. The side faces 44a, 44a of the under cover 44 are attached to side portions of the second brackets 82, 82. It is to be noted that a bottom face 44b is provide for the under cover 44.

In this manner, the under cover 44 is a member formed like a bathtub, an enclosed space 85 is formed from the under cover 44 and the floor step 17. Since the batteries 18, 18 are accommodated in the enclosed space 85, the batteries 18, 18 can be prevented from being exposed to splashed mud water, dust, or the like.

Figure 6:
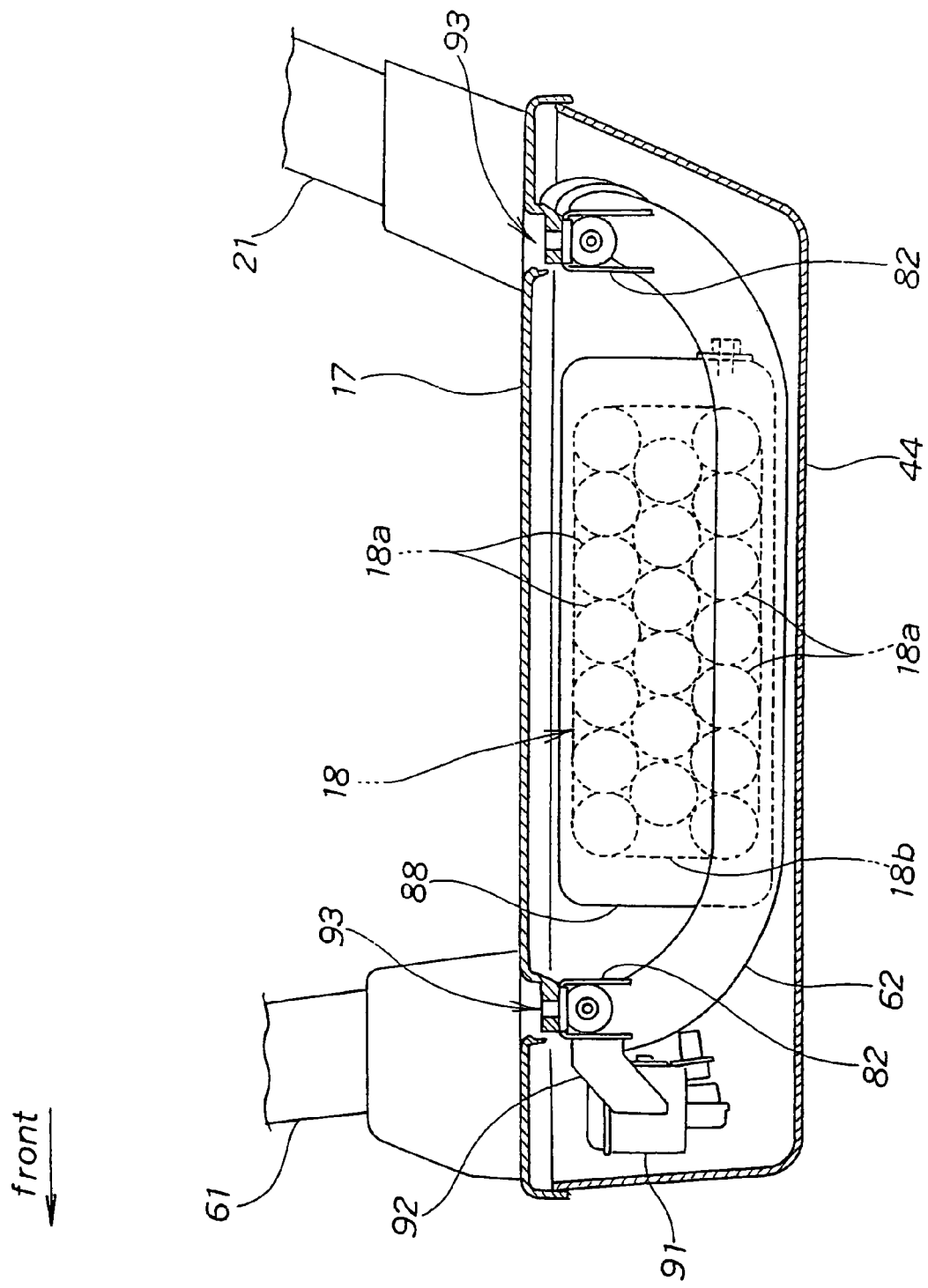
FIG. 6 is a sectional view showing a battery carried on the motor-driven vehicle according to the present invention.

FIG. 6 is a sectional view showing a battery carried on the motor-driven vehicle according to the present invention. An arrow marks the front in FIG. 6 to indicate the forward direction of the vehicle (this applies to the following description).

A battery 18 includes a plurality of column-shaped nickel hydrogen battery cells 18a stacked with each other and the shrink pack 18b described hereinabove in which the nickel hydrogen battery cells 18a are packed. The battery 18 is accommodated in and disposed together with a battery case 88 below the floor step 17. A winker relay 91 is attached to one of the lower pipes 62 by a bracket 92 with attaching portions 93, . . . provided on the floor step 17 for attaching the floor step 17 to the second brackets 82, . . . .

Figure 7:
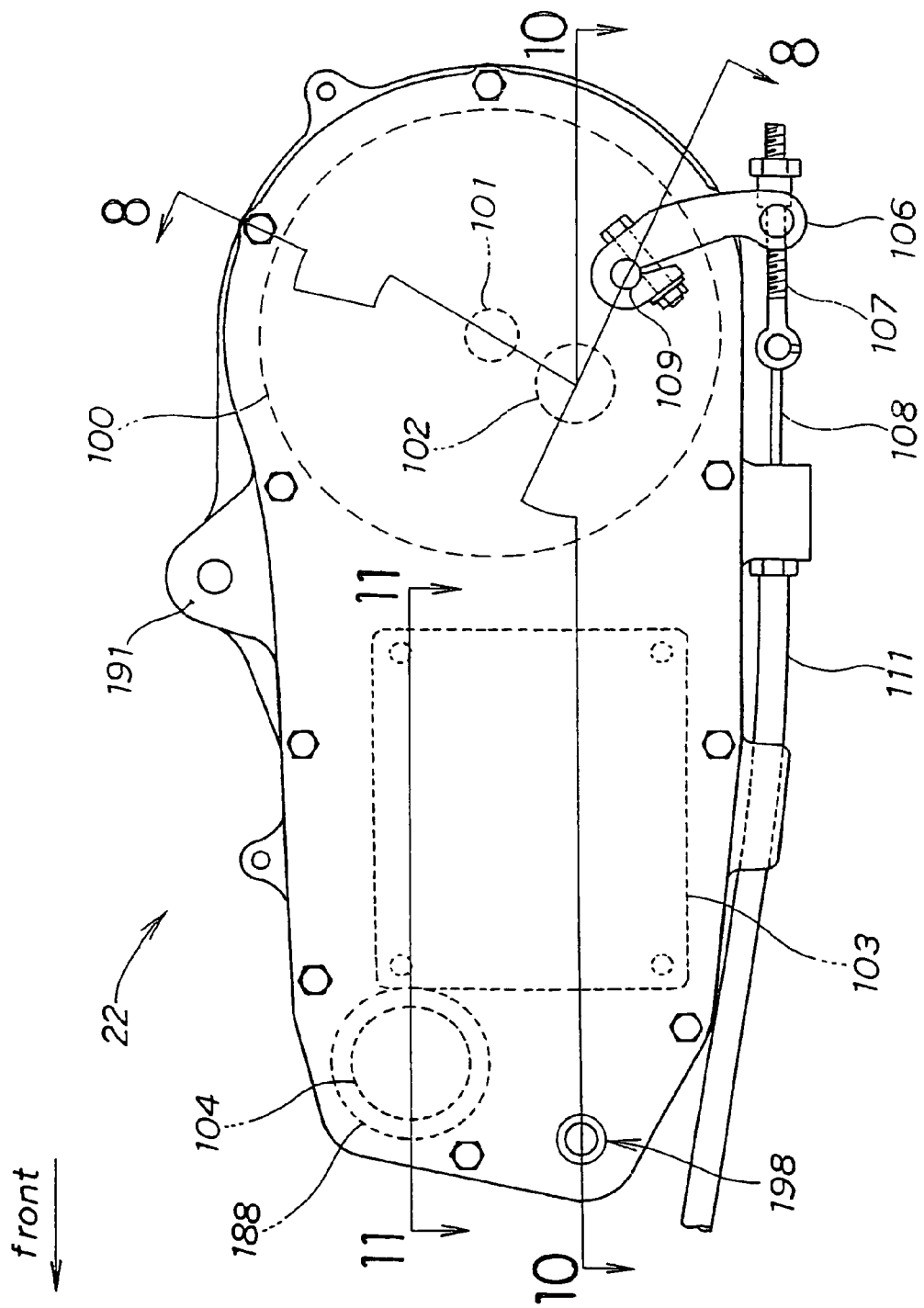
FIG. 7 is a first side elevational view of a power unit according to the present invention.

FIG. 7 is a first side elevational view of the power unit according to the present invention illustrating a view of the power unit 22 as viewed from the side opposite to the rear wheel 23. See, FIG. 1.

The power unit 22 includes a motor 100 accommodated in a rear half thereof, and an output power shaft 101 of the motor 100 is connected to an axle 102 of the rear wheel 23. See, FIG. 1. Further, a power control section 103 for controlling the power to be supplied to the motor 100, that is, for controlling the driving of the motor 100, and a smoothing capacitor 104 provided for the power control section 103 are attached to a front half of the power unit 22.

It is to be noted that the power transmission type of power unit 22 is a reduction type wherein output power of the motor 100 is transmitted to the rear wheel 23 through a speed reduction mechanism (hereinafter described). The power control section 103 is formed from a switching member such as a power FET (FET: Field Effect Transistor).

A brake arm 106 is provided which includes a drum brake for braking the rear wheel 23. An adjustment member 107 is attached to an end of the brake arm 106 with a wire 108 connected to the adjustment member 107 and connected to a brake lever (not shown). An outer cable 111 is provided for accommodating the wire 108 for movement therein. When the brake lever is gripped, the brake arm 106 is swung through the wire 108 and the adjustment member 107 to rotate a cam member provided at an end of a brake shaft 109, which serves as a pivot shaft of the brake arm 106, to press a brake shoe (details are hereinafter described) against the brake drum (details are hereinafter described) through the cam member to brake the rear wheel 23. The adjustment member 107 is a member for adjusting the initial angle of the brake arm 106.

It is to be noted that, in the present embodiment, the output power shaft 101 of the motor 100 is disposed in a state offset to a position obliquely upwardly and rearwardly of the axle 102. When the output power shaft 101 and the axle 102 are disposed in this manner, the length of the vehicle body in the forward and backward direction can be reduced to obtain miniaturization of the vehicle body. The output power shaft 101 may alternatively be disposed at another position obliquely upwardly and forwardly of the axle 102.

Figure 8:
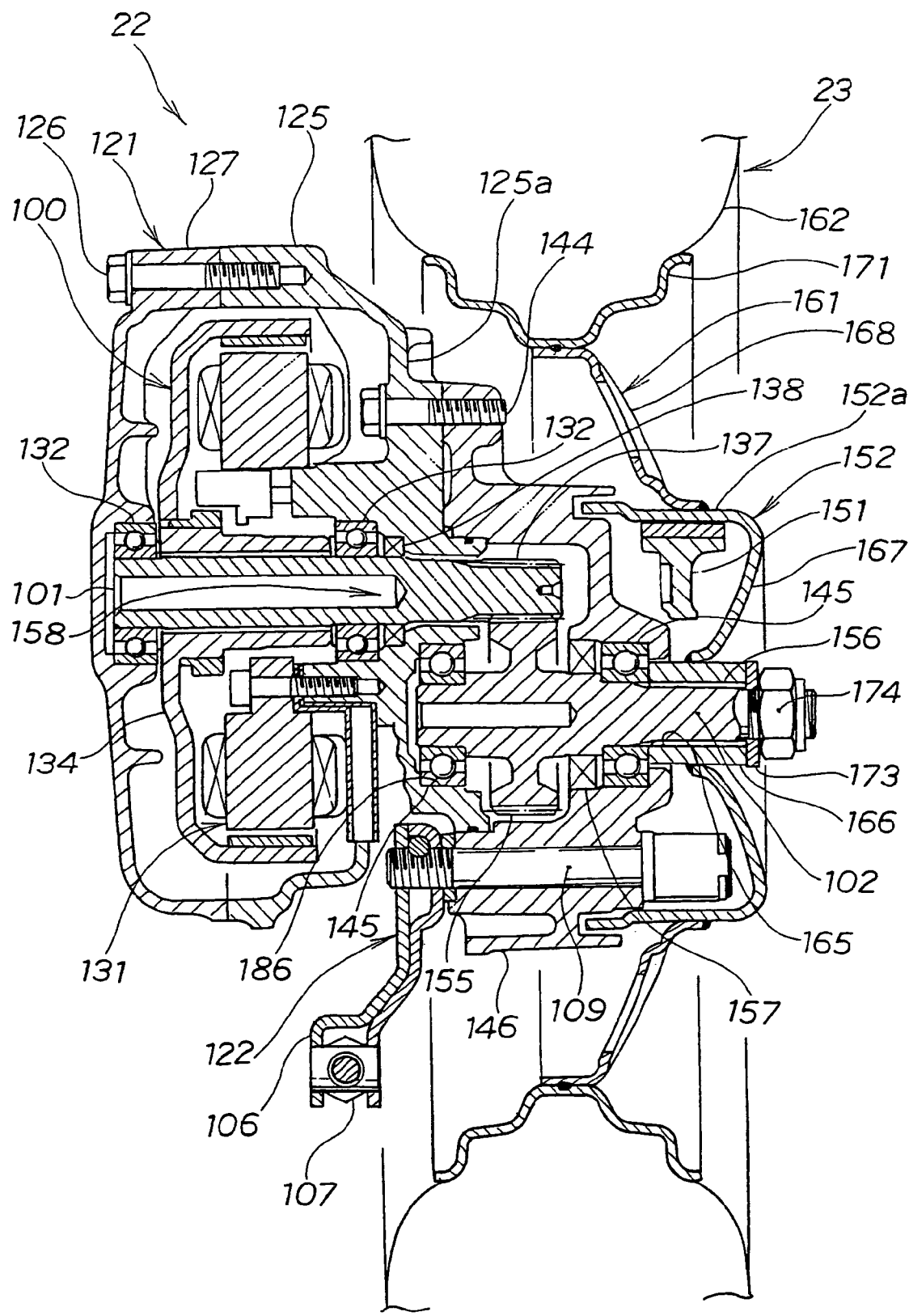
FIG. 8 is a sectional view taken along line 8—8 of FIG. 7.

FIG. 8 is a sectional view taken along line 8—8 of FIG. 7. The power unit 22 includes a unit case 121 in which the motor 100 is accommodated with a drum brake system 122 being attached to a side face of the unit case 121, and the aforementioned axle 102 attached to the drum brake system 122.

The unit case 121 is a two-piece member including a case body 125 on the rear wheel 23 side and a case cover 127 attached to an open side of the case body 125 by means of bolts 126, . . . (in the figure, only one is shown).

The motor 100 is of the outer rotor type including a stator 131 attached to the case body 125 with the aforementioned output power shaft 101 attached for rotation to the unit case 121 through bearings 132, 132, and a rotor 134 attached to the output power shaft 101 through a spline coupling. A toothed portion 137 formed at an end of the output power shaft 101. A dust seal 138 is mounted to the unit case 121.

The drum brake system 122 is an apparatus attached to an inner side face 125a of the case body 125 by means of bolts 144, . . . . The drum brake system 122 includes a base portion 146 cooperating with the case body 125 to support the axle 102 for rotation by means of bearings 145, 145 with the aforementioned brake shaft 109 attached for rotation to the base portion 146 and having the brake arm 106 attached to an end portion thereof. The drum brake system 122 further includes a cam member (not shown) attached to the other end portion of the brake shaft 109, a brake shoe 151 for being pressed by the cam member upon rotation of the cam member to open diametrically outwardly, a cup-shaped brake drum 152 having an inner face against which the brake shoe 151 is pressed, and the aforementioned brake arm 106.

The axle 102 is a member on which a toothed portion 155 is formed for meshing with the toothed portion 137 of the output power unit 101 and a male spline portion 156 for coupling to the rear wheel 23. A dust seal 157 is provided between the base portion 146 and the axle 102.

The output power unit 101 having the toothed portion 137 provided thereon and the axle 102 having the toothed portion 155 provided thereon are members forming a speed reduction mechanism 158.

The rear wheel 23 includes a wheel portion 161 attached to the axle 102 and a tire 162 mounted on an outer periphery of the wheel portion 161.

The wheel portion 161 includes the aforementioned brake drum 152 composed of a boss portion 166 having a female spline portion 165 coupled to the male spline portion 156 of the axle 102 and a cup-shaped drum portion 167. A disk portion 168 is attached to an outer periphery 152a of the brake drum 152 with a rim portion 171 attached to an outer periphery of the disk portion 168. A washer 173 and a nut 174 are provided for attaching the rear wheel 23 to the axle 102, respectively.

The configuration of the power unit 22 shown in FIG. 8 is described in more detail.

The wheel portion 161 is a member with a center side (that is, the drum portion 167 side) that projects from the center in the vehicle in a widthwise direction of the rear wheel 23 to the side opposite to the motor 100. In particular, the boss portion 166 serves as the center of rotation of the rear wheel 23 and is in an offset state.

Since the speed reduction mechanism 158 is provided between the motor 100 and the rear wheel 23 and is disposed in a manner projecting from the wheel portion 161 to be offset in such a manner as described above, even if the power unit 22 of the reduction type is adopted, the projecting amount of the power unit 22 in the sideward direction of the vehicle body with respect to the rear wheel 23 can be maintained to be small. Therefore, since the power unit 22 and the rear wheel 23, which are heavy articles, can be disposed substantially at the center in the vehicle widthwise direction. Consequently, the weight balance of the vehicle body is improved and the operating performance and so forth can be improved.

Now, the power transmission from the motor 100 to the rear wheel 23 is described.

A driving current is supplied to the stator 131 under the control of the power control section 103.

The control of the driving current is performed, for example, by PWM (Pulse Width Modulation) control.

The PWM control is a method of applying a pulsed voltage to the motor 100 and varying the ratio (duty ratio) between an on duration and an off duration of the pulse to control the speed of rotation (and torque) of the motor 100.

Through the PWM control described above, the rotor 134 is rotated by a rotating magnetic field generated around the stator 131 to rotate the output power shaft 101. The power from the output power shaft 101 is reduced in speed by the toothed portion 137 and the toothed portion 155 and transmitted to the axle 102. In this manner, the power from the motor 100 is transmitted at a reduced speed to the rear wheel 23.

It is to be noted that, while, in the present embodiment, a speed reduction mechanism is described that includes the output power shaft 101 and the axle 102 having a fixed speed reduction ratio, the power from the motor 100 may be transmitted to the rear wheel 23 after the speed thereof is changed by another speed reduction mechanism. As such a speed reduction mechanism as just described, for example, a continuously variable transmission may be used.

Further, the motor-driven vehicle according to the present invention further includes a regenerative charging mechanism. In particular, when the drum brake system, front wheel brake, engine brake, or the like acts to decelerate the motor-driven vehicle 10, the motor 100 is driven as a generator and has a function of converting the power of rotation transmitted from the rear wheel 23 to the motor 100 upon a speed reduction into electric energy and storing the electric energy in the batteries 18, 18.

Figure 9:
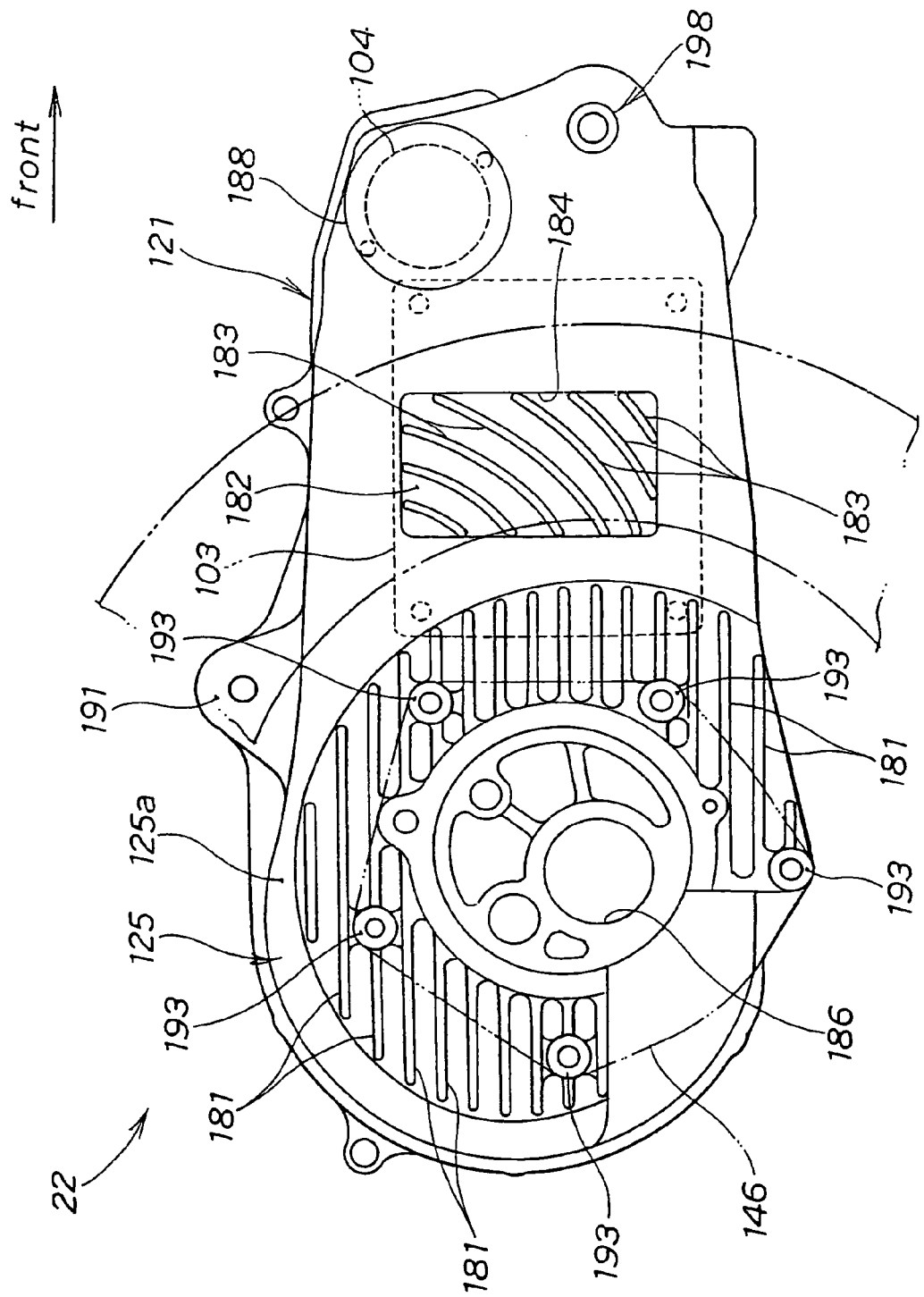
FIG. 9 is a second side elevational view of the power unit according to the present invention.

FIG. 9 is a second side elevational view of the power unit according to the present invention and illustrates a view as viewed from the rear wheel 23 side.

The power unit 22 has first fins 181, . . . for heat radiation formed on the inner side face 125a of the case body 125, a rectangular window portion 184 for exposing second fins 183, . . . provided on a case 182 of the power control section 103 to the outside, the smoothing capacitor 104 attached to a position thereof forwardly of the window portion 184, and a hole portion 186 perforated therein so that the axle 102, see FIG. 8, passes through the same. A capacitor case 188 is provided for accommodating the smoothing capacitor 104 therein with a cushion lower end 191 attaching portion provided on the unit case 121 for attaching a lower end of the rear cushion unit 24. See, FIG. 1.

A substantially pentagonal member indicated by imaginary lines in FIG. 9 is the base portion 146 of the drum brake system 122, see FIG. 8, described hereinabove. A base portion 193, . . . is provided for attaching portions provided on the case body 125 for attaching the base portion 146 to the inner side face 125a of the brake drum 152.

Figure 10:
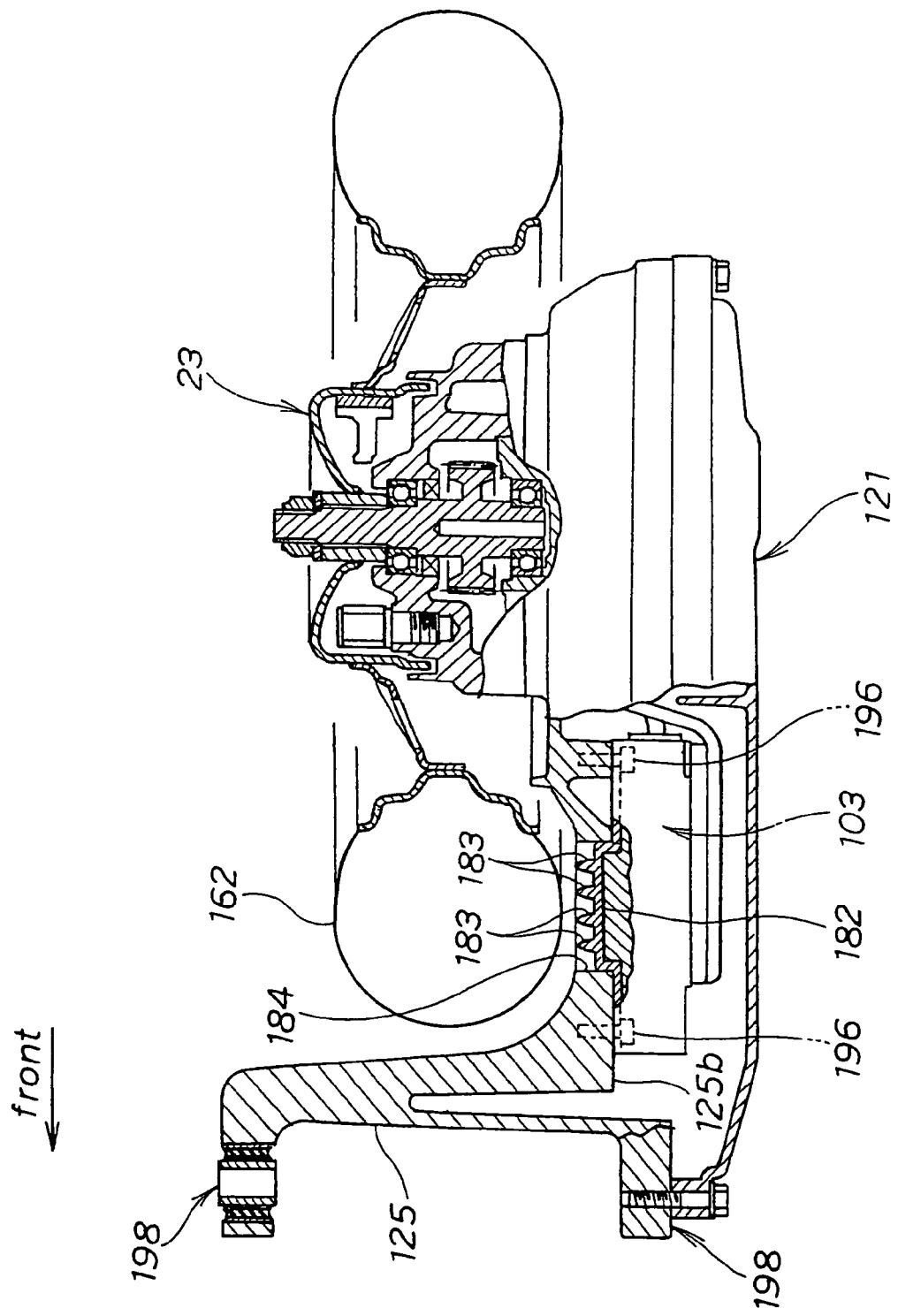
FIG. 10 is a sectional view taken along line 10—10 of FIG. 7.

FIG. 10 is a sectional view taken along line 10—10 of FIG. 7 and illustrates that the power control section 103 is attached to an inner face 125b of the case body 125 of the unit case 121 by means of bolts 196, . . . and the case 182 of the power control section 103 is exposed to the outer side through the window portion 184 of the case body 125. The second fins 183, . . . are positioned closely to the tire 162 of the rear wheel 23. Frame attaching portions 198, 198 are attached to the power unit supporting member 71, see FIG. 2, on the vehicle body frame 11, see FIG. 2, through a swing shaft.

Figure 11:
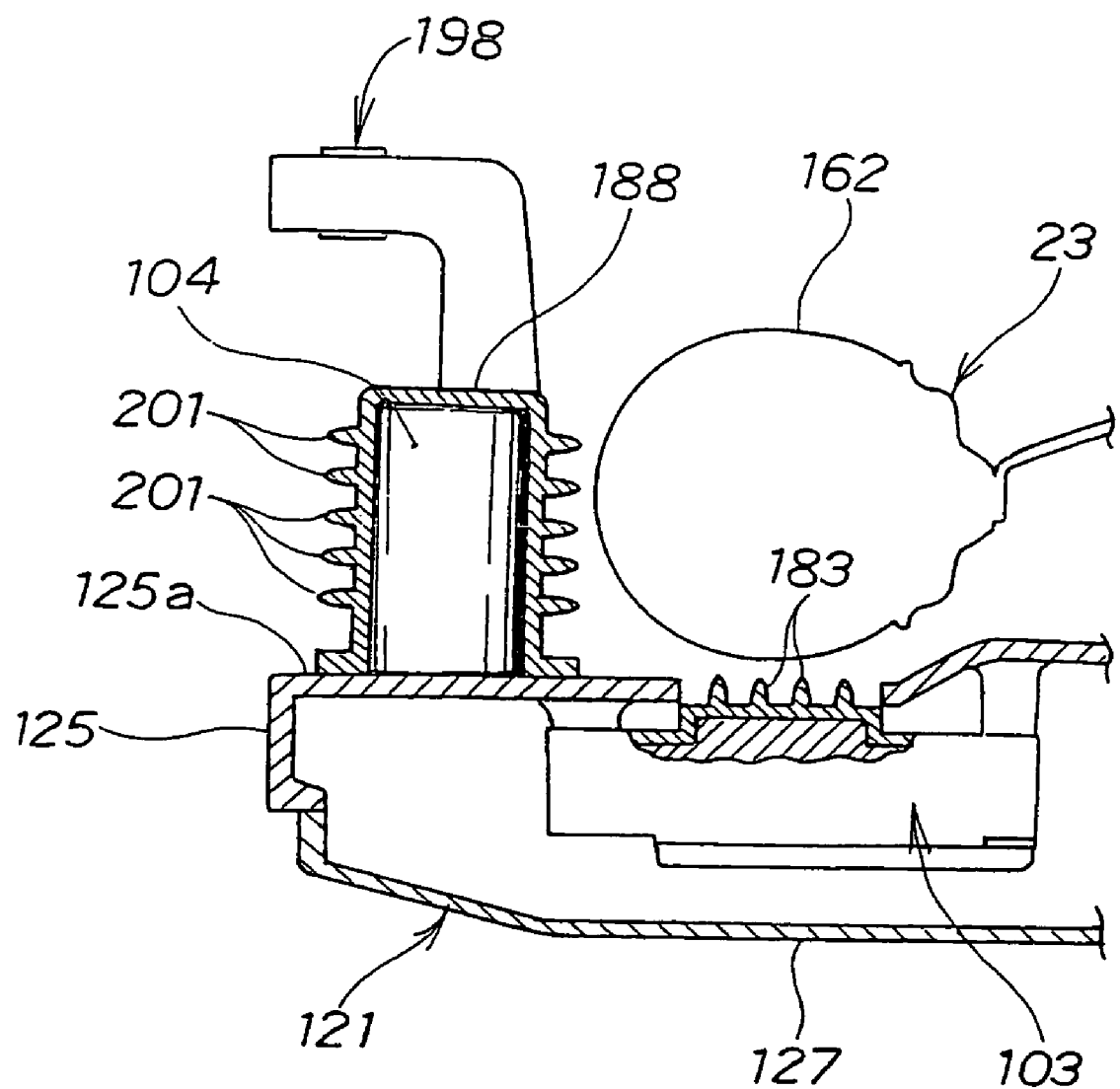
FIG. 11 is a sectional view taken along line 11—11 of FIG. 7.

FIG. 11 is a sectional view taken along line 11—11 of FIG. 7 and illustrates that the smoothing capacitor 104 is attached to a front portion of the inner side face 125a of the case body 125 and is accommodated in the capacitor case 188, which has third fins 201, . . . formed on an outer periphery thereof. The capacitor case 188 is positioned closely to the rear wheel 23, or more particularly to the tire 162. It is to be noted that the capacitor case 188 is attached to the case body 125 by means of screws.

A cooling action of the power unit 22 described above is disclosed below.

Figure 12:
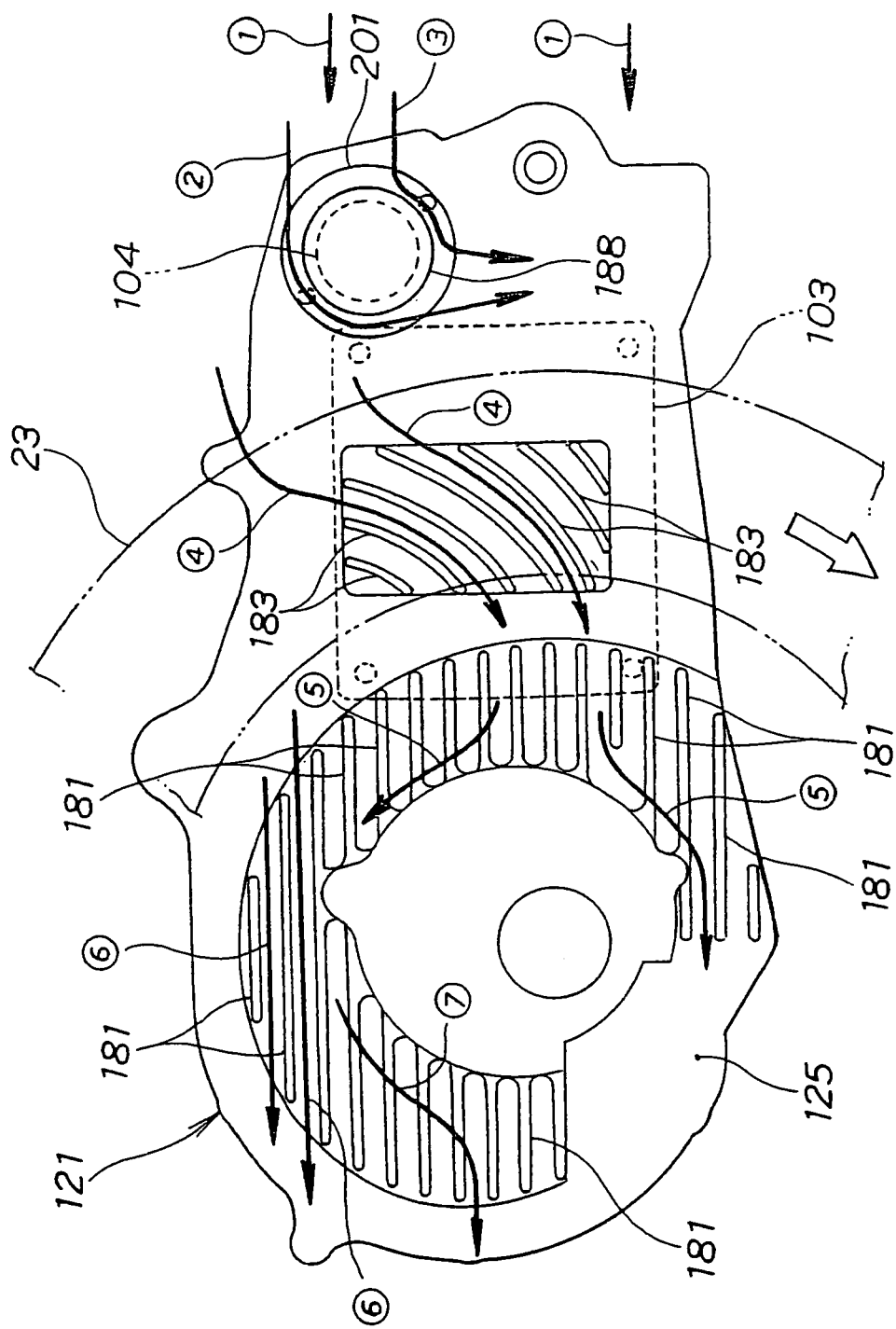
FIG. 12 is a first view of an action illustrating cooling of the power unit according to the present invention.

FIG. 12 is a first view of an action illustrating the cooling of the power unit according to the present invention, and cooling by wind during operation and air flows generated by rotation of the rear wheel 23 (indicated by an imaginary line) is described.

While the motor-driven vehicle is operating, wind flows as indicated by arrow marks 1 inside a circle, and since the rear wheel 23 rotates as indicated by a void arrow mark, air flows generated in the direction of rotation of the axle 102 are additionally generated in the proximity of the rear wheel 23. Consequently, the operating wind flows along the third fins 201, . . . of the capacitor case 188 and is directed downwardly as indicated by arrow marks 2 inside a circle and 3 inside a circle and absorbs heat from the smoothing capacitor 104 through the capacitor case 188.

Further, since the operating wind flows along the second fins 183, . . . of the power control section 103 together with the air flows described above as indicated by arrow marks 4 inside a circle it absorbs heat from the power control section 103.

Furthermore, the operating wind flows in the proximity of the first fins 181, . . . of the case body 125 as indicated by arrow marks 5 inside a circle and flows along the first fins 181, . . . as indicated by arrow marks 6 inside a circle, and part of the operating wind of the arrow mark 6 inside a circle turns around the attaching portion of the base portion and flows in the proximity of the first fins 181 as indicated by an arrow mark 7 inside a circle.

Figure 13:
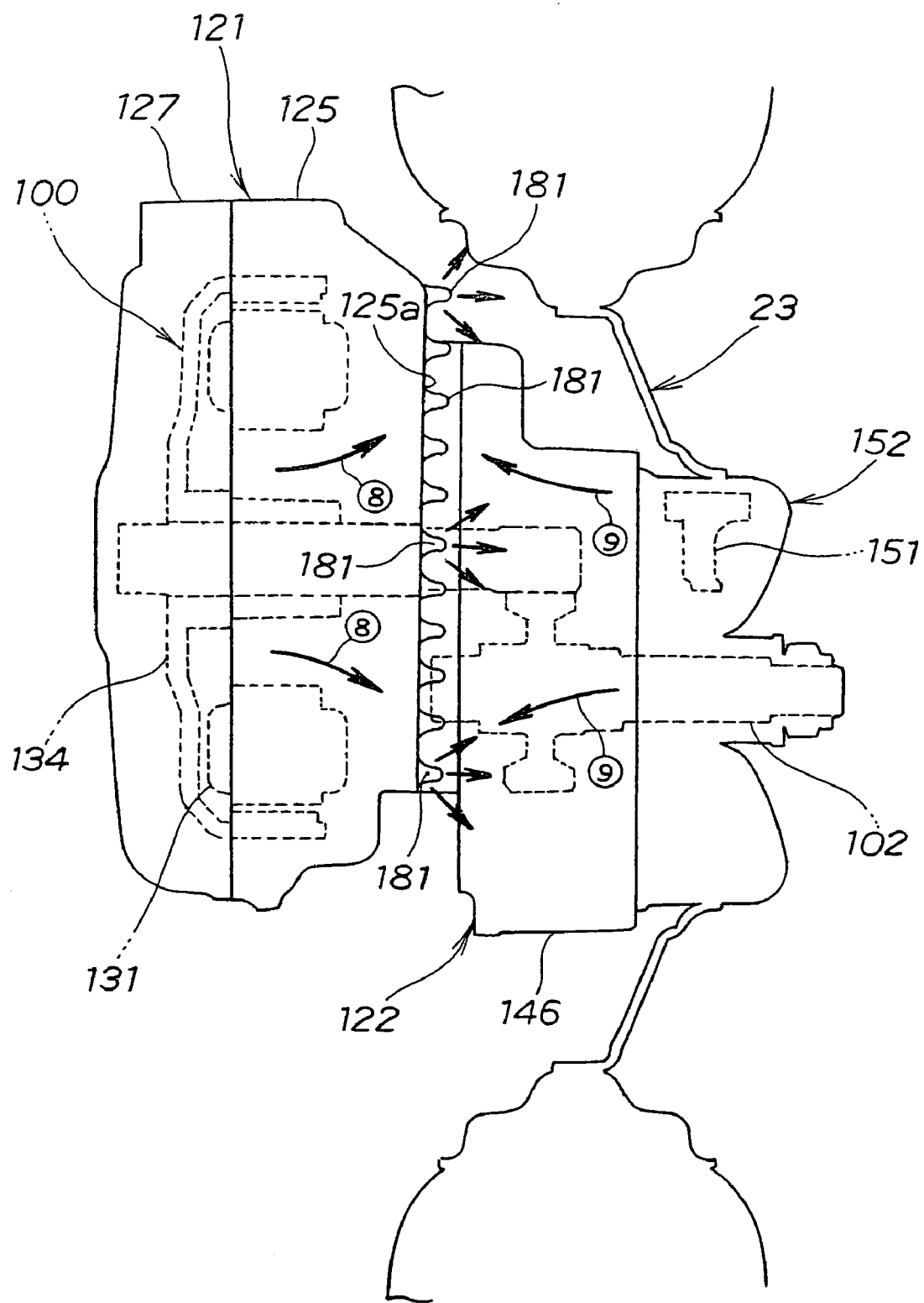
FIG. 13 is a second view of an action illustrating cooling of the power unit according to the present invention.

FIG. 13 is a second view of an action illustrating the cooling of the power unit according to the present invention, and the cooling of the motor 100 side and the drum brake system 122 side is described.

When the motor 100 is operated, much heat is generated particularly on the stator 131 on which the coil is provided. Further, when the rear wheel 23 is braked by the drum brake system 122 during operation, heat is generated by friction between the brake shoe 151 and the brake drum 152.

The heat generated flows from the motor 100 side to the first fins 181, . . . side of the case body 125 as indicated by arrow marks 8 inside a circle and flows from the drum brake system 122 to the brake drum 152→axle 102→base portion 146→first fins 181, . . . of the case body 125 as indicated by arrow marks 9 inside a circle. As a result, the heat escapes from the first fins 181, . . . to the atmospheric air. Consequently, the motor 100 and the drum brake apparatus 122 can be cooled. Further, since the first fins 181, . . . are positioned between the motor 100 and the drum brake system 122, heat is less likely to be transmitted from the drum brake system 122 to the motor 100.

Figure 14:
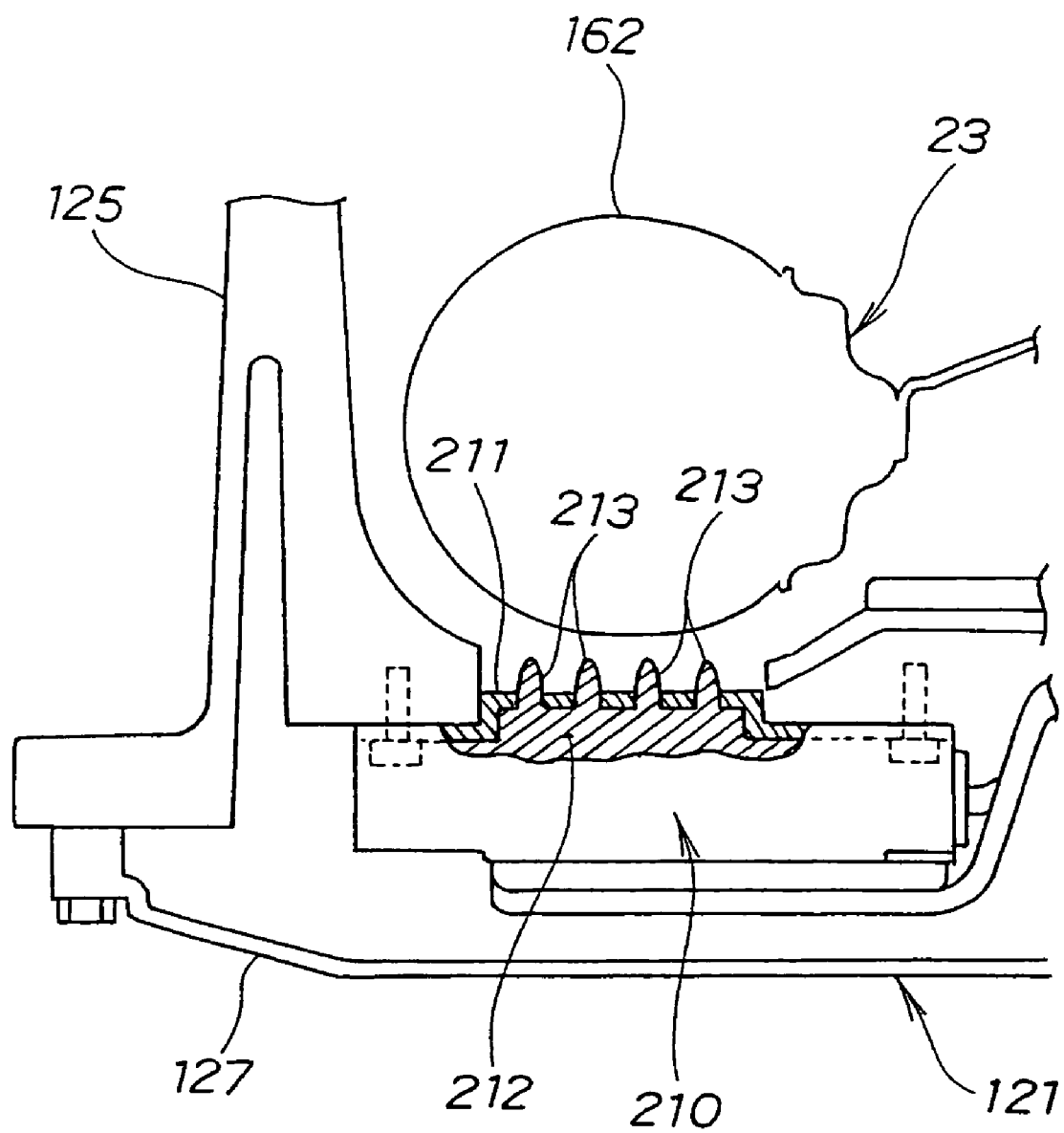
FIG. 14 is a sectional view showing an embodiment of a cooling structure for a power control section according to the present invention.

FIG. 14 is a sectional view showing another embodiment of a cooling structure for the power control section according to the present invention, and like elements to those of the embodiment shown in FIG. 10 are denoted by like reference characters and detailed description of them is omitted.

A power control section 210 includes an FET provided in a case 211 and having a heat radiating plate 212 attached thereto. Fourth fins 213, . . . are formed on the heat radiating plate 212 and extend through the case 211 so as to be exposed to the outside until it is positioned in the proximity of the rear wheel 23, or more particularly to the tire 162.

Since the fourth fins 213, . . . of the heat radiating plate 212 are exposed to the outside in this manner, heat generated by the FET can be radiated directly to the atmospheric air from the fourth fins 213, . . . of the heat radiating plate 212, and consequently, the FET and hence the power control section 210 can be cooled further effectively.

Figure 15:
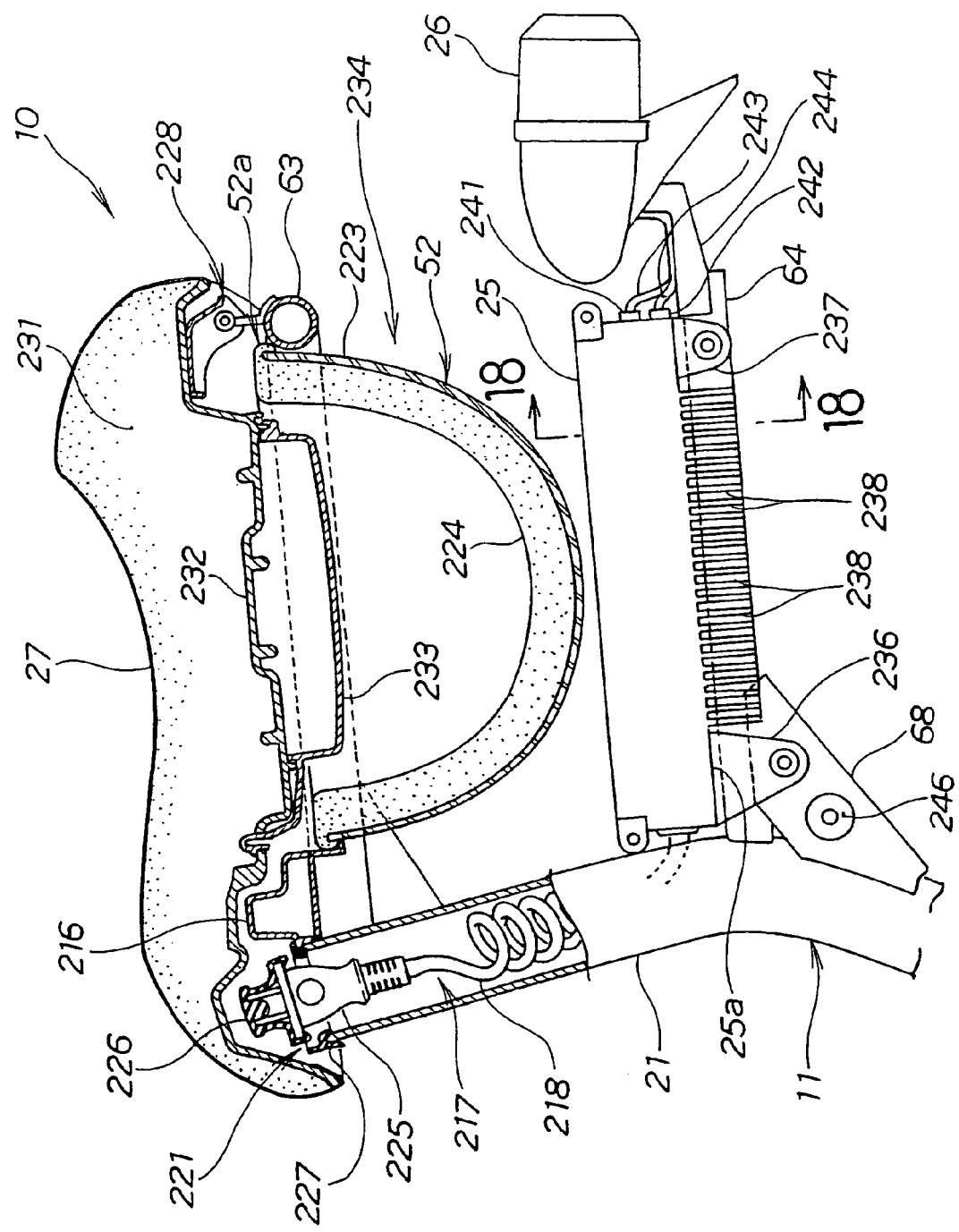
FIG. 15 is a side elevational view (partly in section) of the motor-driven vehicle according to the present invention.

FIG. 15 is a side elevational view (partially in section) of a rear portion of the motor-driven vehicle according to the present invention and illustrates that a helmet 52 having an outer face of a substantially hemispherical shape is hooked at an edge thereof to the helmet supporting member 216 attached to the seat post 21 and the seat frame 63 so as to be held. A charging cable 218 is provided in a curled configuration connected to the charging and voltage conversion apparatus 25 and is accommodated in a hollow portion 217 of the seat post 21 while the seat 27 covers over an opening 221 at which the hollow portion 217 opens to the outside and over the helmet 52.

The helmet 52 includes an outer hull member 223 and a buffer member 224 provided in the outer hull member 223 and is widened at an edge portion 52a thereof such that it can be hooked on the helmet supporting member 216 and the seat frame 63 described above.

A plug 225 of the charging cable 218 is provided together with a cap 226 fitted on the plug 225. An edging member 227 is attached to an upper end portion of the seat post 21 with a seat hinge 228 for attaching the seat 27 for opening and closing motion to the seat frame 63. A seat cushion member 231, a seat bottom plate 232, and a tray 233 are removably attached to the seat bottom plate 232 for accommodating documents and so forth therein.

As described above, the space below the seat 27 is an article accommodating space 234 which is as an exposing space for accommodating the helmet 52 as an article therein. The article accommodating space 234 is an open space, which does not have a partition wall for partitioning from the outside.

Since the article accommodating space 234 having such a configuration as described above is disposed immediately below the seat 27, even if it rains, the helmet 52 does not become wet, and there is no necessity to specially provide a weather strip.

Further, although the space below the seat 27 of the motor-driven vehicle 10 according to the present embodiment is formed as an exposing space, since the helmet 52 is accommodated below the seat 27, the space can provide a novel impression that it does not look at a glance that it accommodates the helmet 52 below the seat 27. Consequently, the charm of the motor-driven vehicle 10 as a commodity can be improved.

The charging and voltage conversion apparatus 25 includes vehicle body side attaching portions 236, 236 (only one reference numeral 236 is shown) and vehicle body side attaching portions 237, 237 (only one reference numeral 237 is shown) provided on the vehicle body frame 11 side. The charging and voltage conversion apparatus 25 is an apparatus wherein the vehicle body side attaching portions 236, 236 are attached to the reinforcement member 68 and the vehicle body side attaching portions 237, 237 are attached to side faces of the intermediate frame 64 such that the charging and voltage conversion apparatus 25 is positioned proximately in an almost contacting state to the seat post 21. Fifth fins 238, . . . serving as cooling fins are provided on a lower face 25a of the charging and voltage conversion apparatus 25.

Since the charging and voltage conversion apparatus 25 is attached in an exposed state to the vehicle body frame 11 in this manner, it can be cooled more effectively when compared with that in an alternative case wherein it is disposed in the vehicle body cover as in the conventional art. In short, since the charging and voltage conversion apparatus 25 is disposed in the exposing space below the seat 27, heat generated by the charging and voltage conversion apparatus 25 can be radiated as it is to the atmospheric air, and the heat radiation performance can be further improved.

Terminals 241 and 242 are provided for connecting leads 243, 243 extending from the tail lamp 26. A lamp 244 includes an attaching portion provided integrally on the tail lamp 26 for attaching the tail lamp 26 to the intermediate frame 64. A cushion upper end 246 includes an attaching portion provided on the reinforcement member 68 for attaching an upper end of the rear cushion unit 24. See, FIG. 1.

In short, since the charging and voltage conversion apparatus 25 and the tail lamp 26 are provided substantially integrally with each other, the wiring distance between the charging and voltage conversion apparatus 25 and the tail lamp 26 can be maintained to be short. Further, since the charging and voltage conversion apparatus 25 and the tail lamp 26 can be readily covered with the same cover, where such a cover as just described is provided, the production cost and so forth can be maintained to be low.

Figure 16:
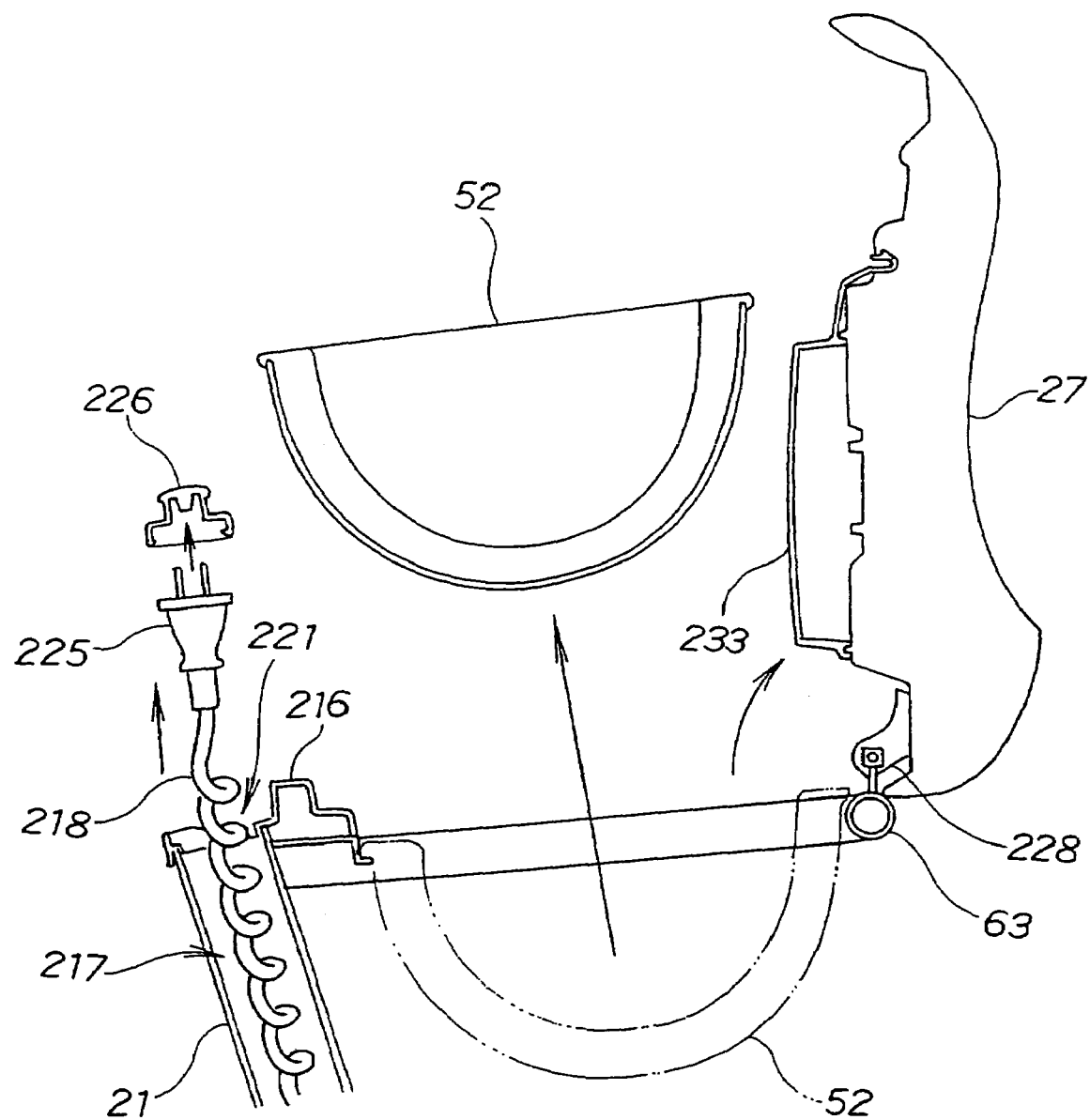
FIG. 16 is a view of an action when a seat according to the present invention is opened.

FIG. 16 is a view of an action when the seat according to the present invention is opened.

A seat lock apparatus not shown for keeping the seat 27 in a locked state to the seat frame 63 is released and the seat 27 is swung upwardly. More specifically, the seat 27 is opened. In the present embodiment, the seat 27 is supported for pivotal motion by a seat hinge 228 provided at a rear portion of the seat frame 63.

Where the seat 27 is opened in this manner, the helmet 52 can be readily taken out upwardly, and the charging cable 218 can be readily taken out upwardly from the hollow portion 217 of the seat post 21. Further, the cap 226 can be removed from the plug 225 of the charging cable 218 and the plug 225 can be inserted into a socket.

Further, the tray 233 below the seat 27 can be removed to readily take out a document, a manual, or the like.

As described above with reference to FIGS. 15 and 16, according to the present invention, a motor-driven vehicle 10, see FIG. 1, including a battery 18 for supplying power to a motor 100, see FIG. 7 and a charging and voltage conversion apparatus 25 for charging the battery 18 are attached to a body frame 11. A charging cable 218 is provided for energizing the charging and voltage conversion apparatus 25. Initially, the charging cable 218 is disposed in a hollow portion 217 of the vehicle body frame 11. During use, the charging cable 218 is removed.

Since the charging cable 218 is disposed in the hollow portion 217 of the vehicle body frame 11, there is no necessity to provide a member specially for accommodating the charging cable. Besides, a dead space in the vehicle body frame 11 can be utilized effectively. Accordingly, compaction and miniaturization of the motor-driven vehicle 10 can be anticipated.

According to the present invention, the motor-driven vehicle 10 includes the charging cable 218 that is accommodated in a seat post 21 forming the vehicle body frame 11 with an opening 221 for taking out the charging cable 218 therethrough being provided at an upper end of the seat post 21. A seat 27 is attached for an opening and closing movement to the seat post 21 such that the opening 221 is covered with the seat 27 in the closed state.

The charging cable 218 and the opening 221 of the seat post 21 can be covered with the seat 27, and there is no possibility that the charging cable 218 may become wet or rainwater may enter the opening 221. Further, since the opening 221 is provided at the upper end of the seat post 21, it is easy to take out the charging cable 218 upwardly. Furthermore, since the seat 27, which covers the article accommodating space 234 from above, covers the opening 221 as well, there is no necessity to provide a special shielding member for covering the opening. Consequently, the number of parts can be reduced and a reduction in the cost can be anticipated.

According to the invention, the motor-driven vehicle includes the charging and voltage conversion apparatus 25 that is disposed closely to the seat post 21.

Since the charging and voltage conversion apparatus 25 is disposed closely to the seat post 21, the charging cable 218 can be formed short with a reduction in weight being anticipated.

Figure 17A:
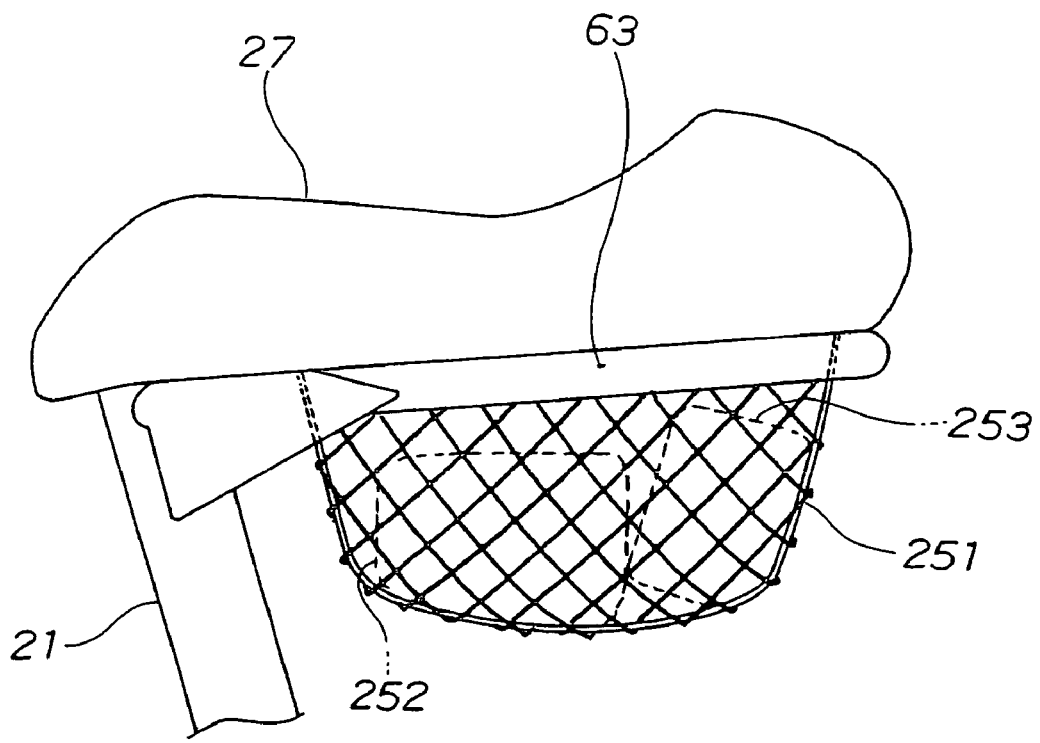
FIGS. 17(a) and 17(b) are side elevational views showing a modification to an accommodation method of an article into a space below the seat according to the present invention.
Figure 17B:
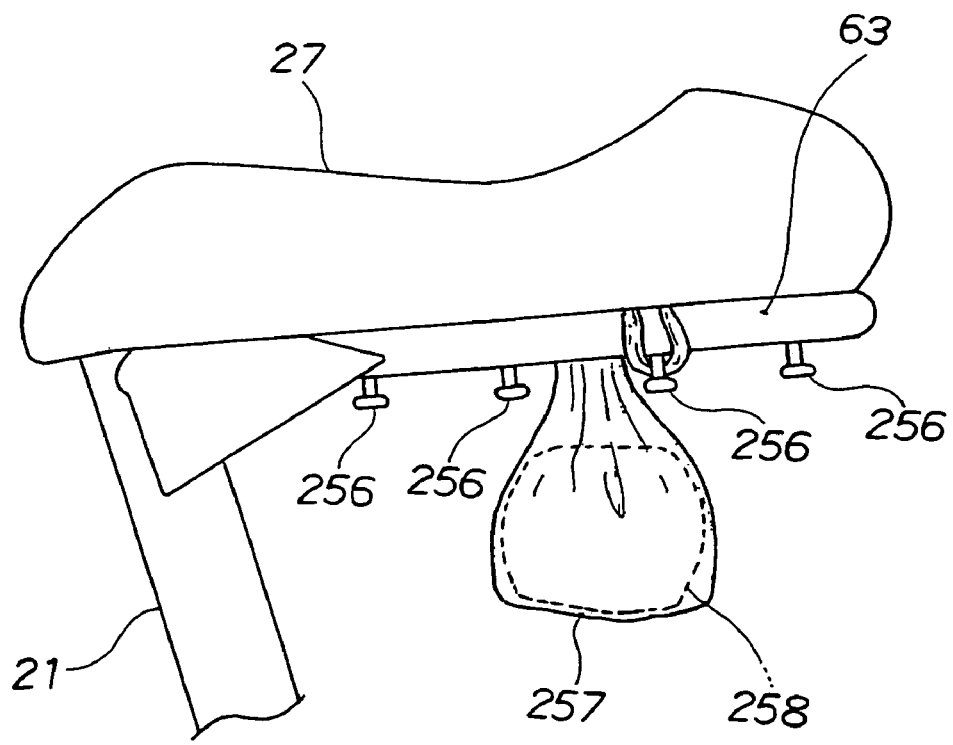

FIGS. 17(a) and 17(b) are side elevational views illustrating modifications to the accommodation method of an article into the space below the seat according to the present invention.

FIG. 17(a) shows that a net 251 is attached to the seat frame 63 and articles 252 and 253 are accommodated in the net 251.

FIG. 17(b) shows that hooks 256, . . . are attached to the seat frame 63 and, for example, a bag 257 is hooked on one of the hooks 256, . . . and an article 258 is accommodated in the bag 257.

As described above with reference to FIGS. 15 and 16, according to the present invention, an under-seat structure for a motorcycle 10, see FIG. 1, is provided wherein a seat frame 63 is attached to a seat post 21 and a seat 27 is attached to the seat frame 63 and includes a seat frame 63 that is elongated substantially horizontally from an upper end portion of the seat post 21 and is covered from above with the seat 27 and is structured so as to hold an article in an exposing state thereon thereby to form an article accommodating space 234 below the seat 27.

Since the seat frame 63 is covered from above with the seat 27 and is structured so as to hold an article in an exposing state thereon, an article can be accommodated immediately below the seat 27, and the article accommodated in the article accommodating space 234 does not become wet with rain even if a cover or the like is not provided in a transverse direction to the article accommodating space 234. Consequently, the necessity for a special structure for preventing an article accommodated in the article accommodating space from becoming wet with rain is eliminated. In addition to the structure described, since the under-seat structure is a simple structure that the seat frame 63 and the seat 27 are attached to the seat post 21, the number of parts can be reduced which will result in a reduction in the weight.

Further, where the article is, for example, a helmet 52, if the helmet 52 is retained on the seat frame 63, then a novel appearance can be obtained wherein it does not appear at a glance that a helmet 52 is accommodated below the seat 27. Consequently, the charm of the structure can be improved to further improve the marketability of the motorcycle 10.

Furthermore, if the seat 27 is formed as a seat of an opening and closing type, then if the seat 27 is opened, then the helmet 52 can be taken out simply, and the convenience with respect to the use when an article is accommodated therein can be improved.

According to the present invention, the under-seat structure for a motorcycle includes a charging and voltage conversion apparatus 25 for charging a battery 18, see FIG. 1, that is disposed at a lower portion of the article accommodating space 234 and is attached to the seat post 21 through an intermediate frame 64. A charging cable 218 is provided for energizing the charging and voltage conversion apparatus 25 that is disposed in the seat post 21 such that an end thereof can be taken out from an upper end of the seat post 21.

Since the charging and voltage conversion apparatus 25 and the charging cable 218 are disposed in dead spaces, which appear around the seat post 21 and in the inside of the seat post 21, the space of the motor-driven vehicle 10 can be utilized effectively.

According to the present invention, the under-seat structure for a motorcycle includes the charging and voltage conversion apparatus 25 that is disposed closely to the seat post 21.

Where the charging and voltage conversion apparatus 25 is disposed closely to the seat post 21, the charging cable 218 can be formed with a reduced length, and a reduction in the weight can be anticipated.

Figure 18A:
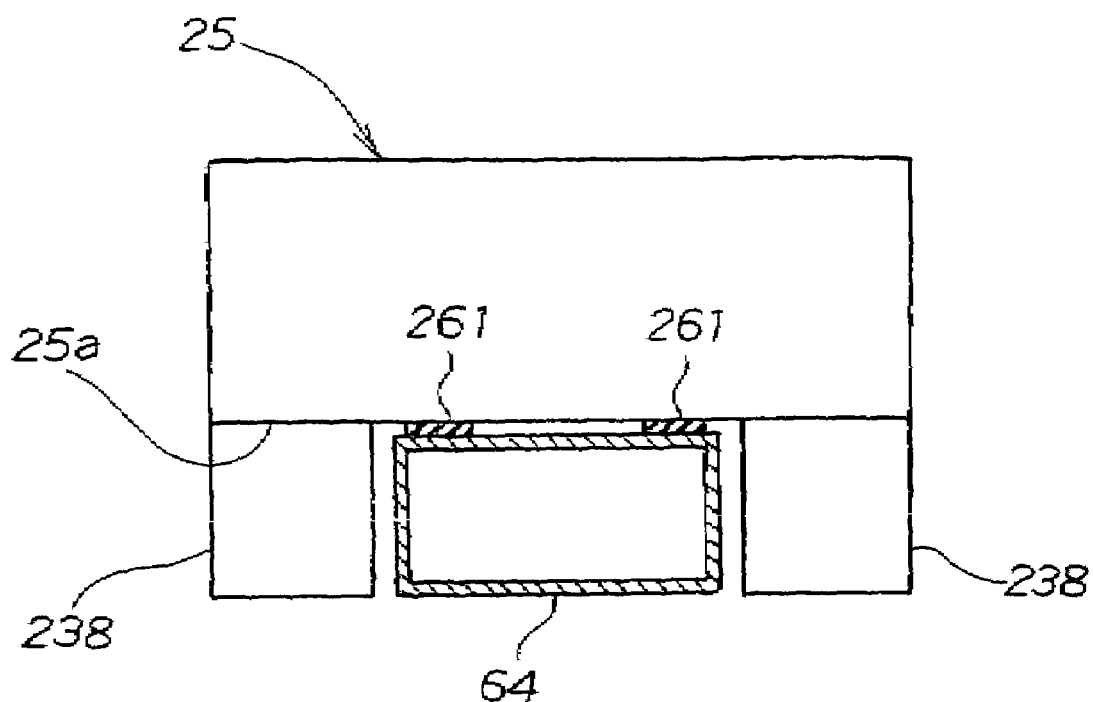
FIGS. 18(a) and 18(b) are schematic views of a charging and voltage conversion apparatus according to the present invention.
Figure 18B:
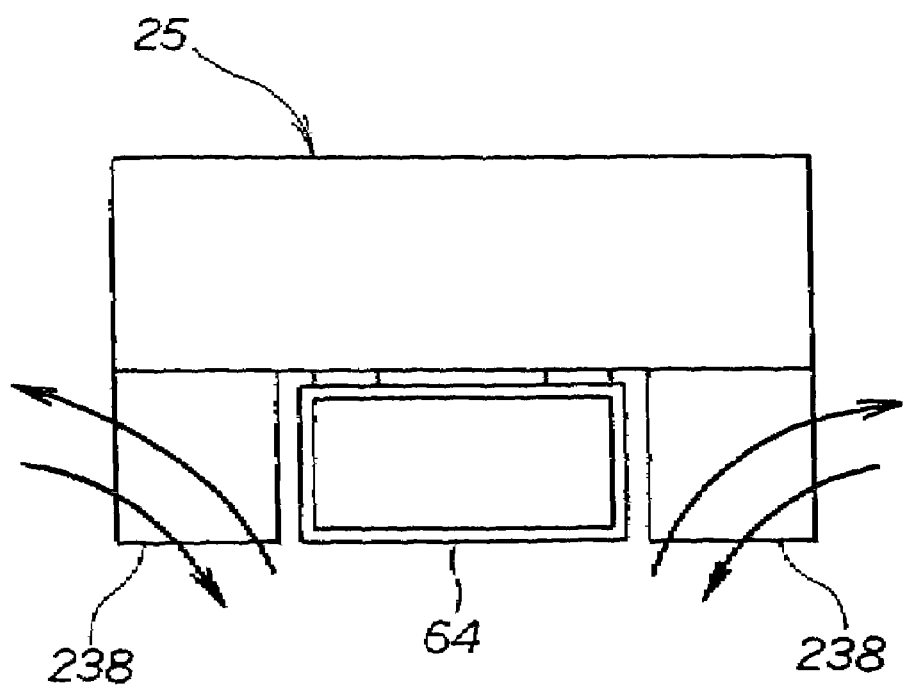
Figure 19:
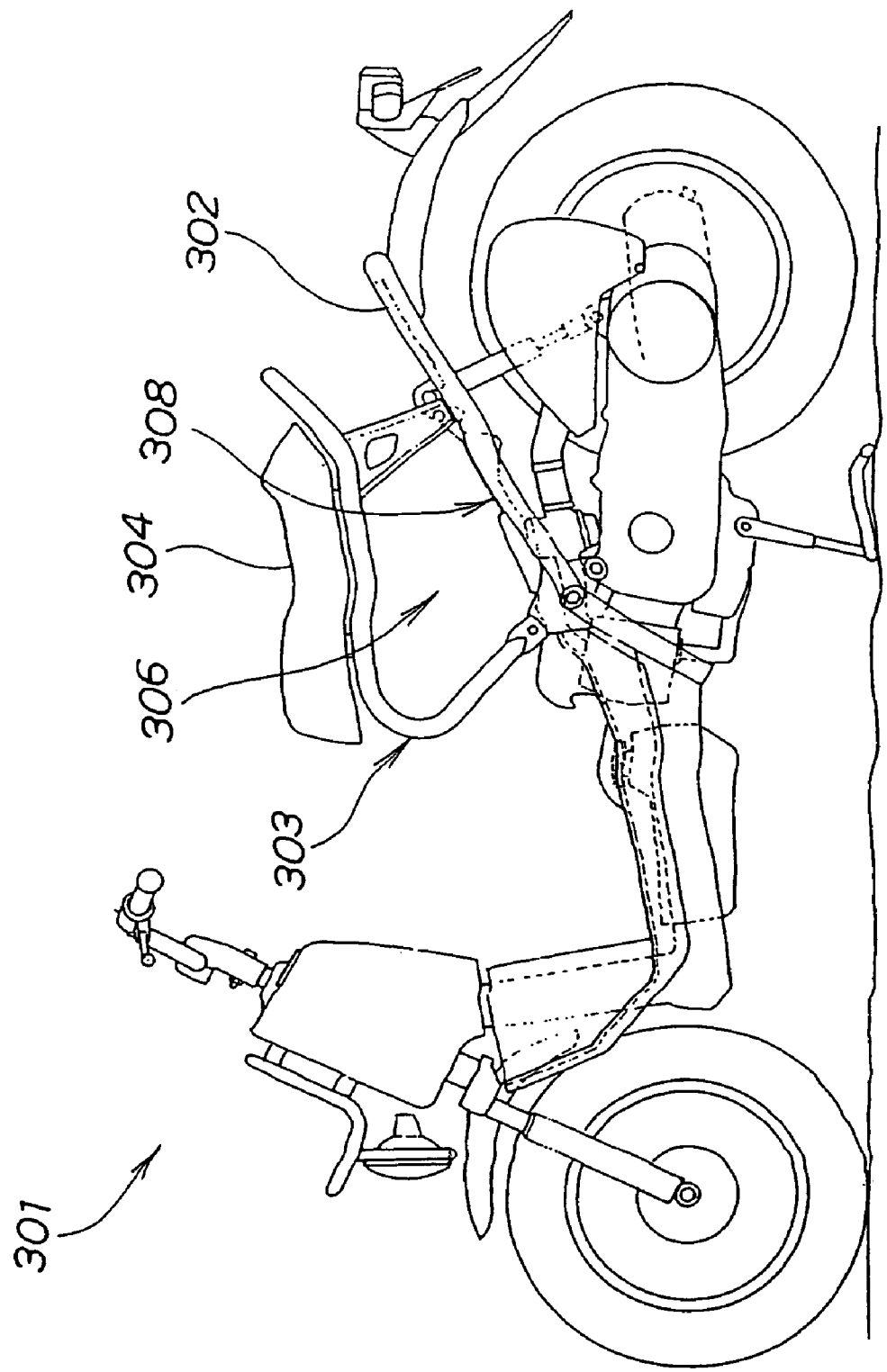
FIG. 19 is a side elevational view showing a conventional under-seat structure for a motorcycle.
Figure 20:
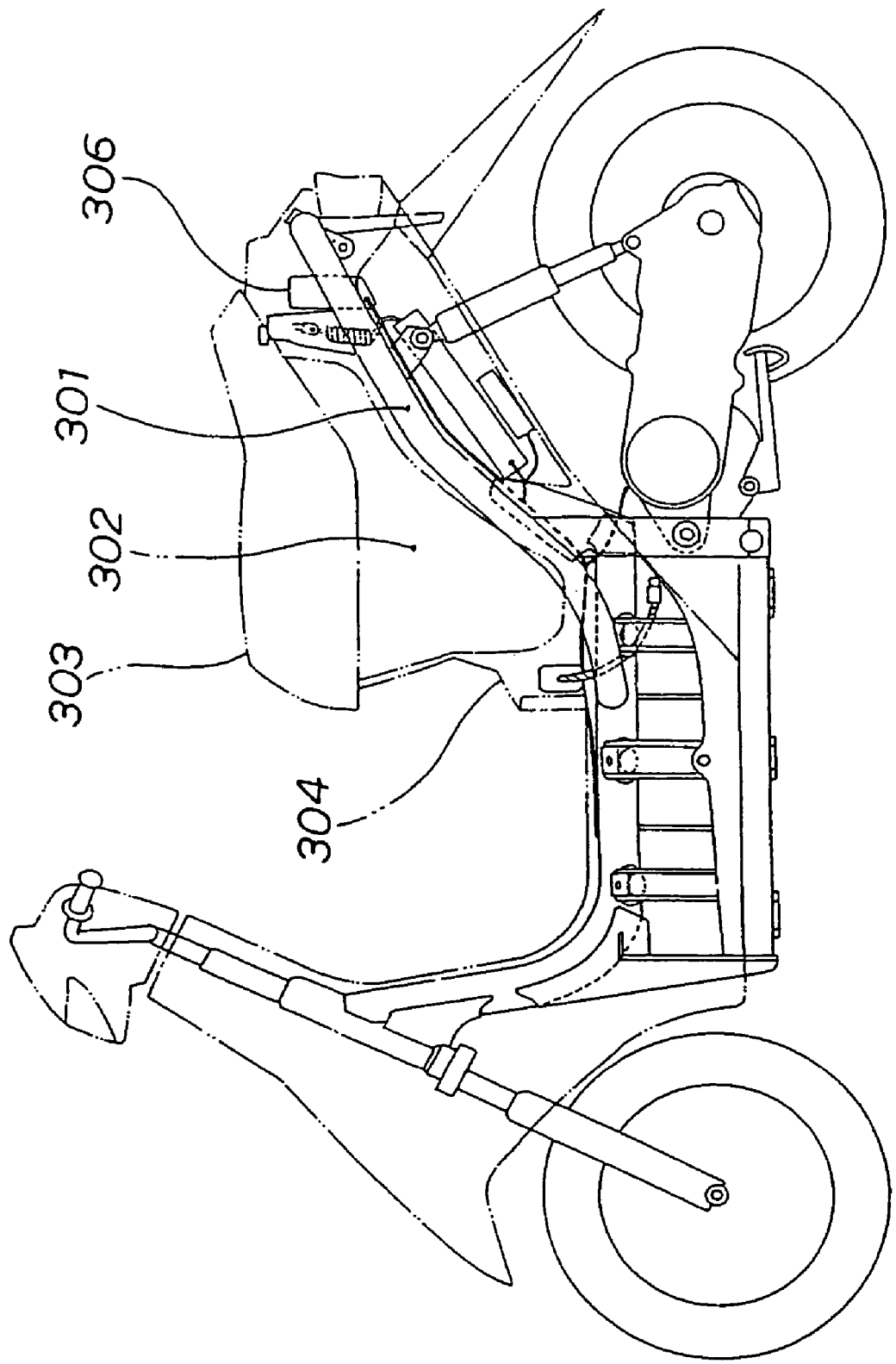
FIG. 20 is a side elevational view showing a conventional under-seat structure for a motorcycle.
Figure 21:
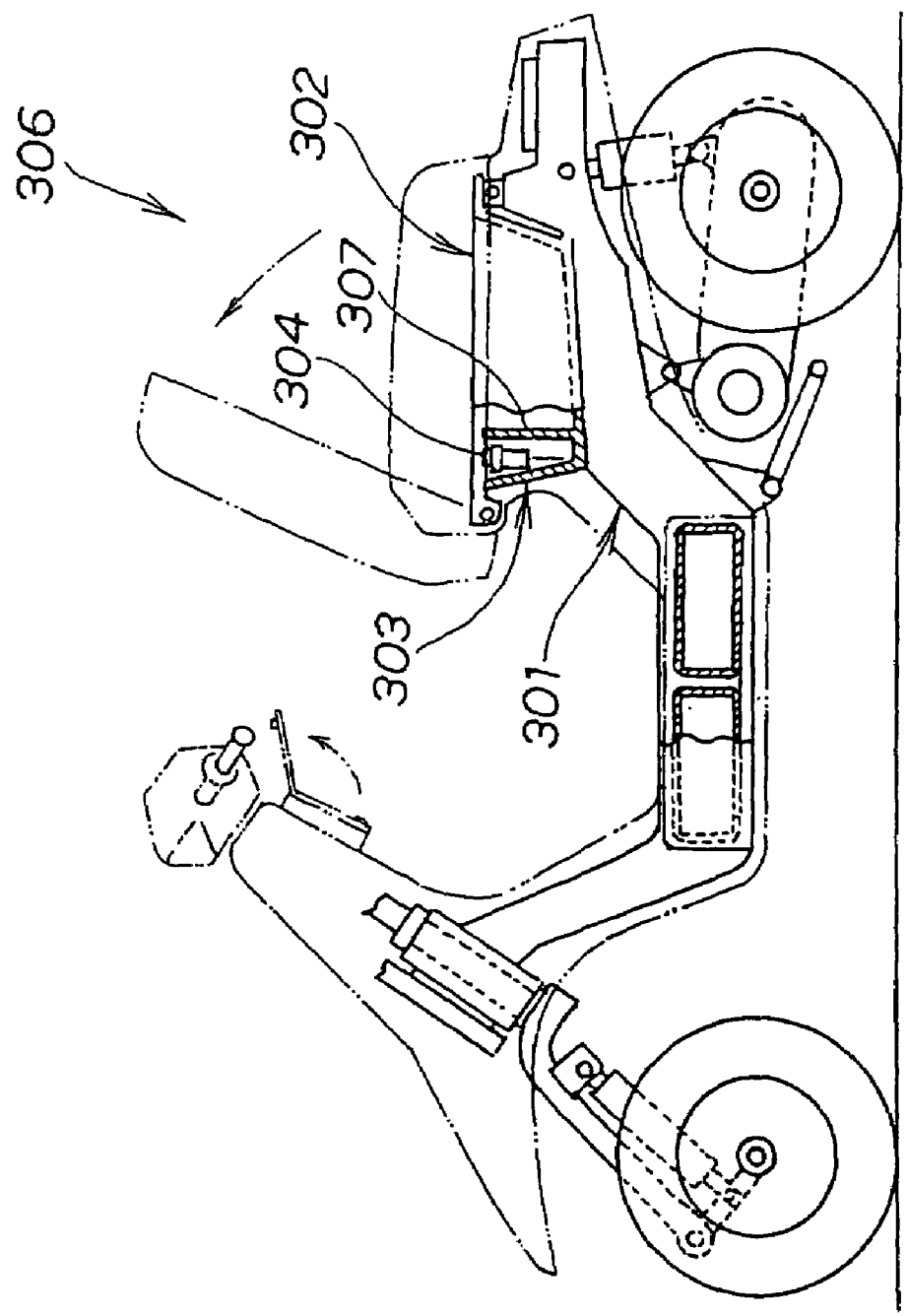
FIG. 21 is a side elevational view showing a conventional under-seat structure for a motorcycle.

FIGS. 18(a) and 18(b) are views illustrating the charging and voltage conversion apparatus according to the present invention with FIG. 18(a) being a sectional view taken along line 18—18 of FIG. 15 and FIG. 18(b) being an action view.

FIG. 18(a) shows that fifth fins 238, . . . that are provided on the lower face 25a of the charging and voltage conversion apparatus 25 such that the fins 238 project downwardly and are disposed on the opposite sides of the intermediate frame 64. It is to be noted that reference numerals 261, 261 denote cushion rubber members interposed between the intermediate frame 64 and the charging and voltage conversion apparatus 25.

In FIG. 18(b), when air flows in the directions indicated by the arrows, heat is generated in the charging and voltage conversion apparatus 25 and radiates from the fifth fins 238, . . . . Consequently, a temperature rise of the charging and voltage conversion apparatus 25 can be suppressed.

It is to be noted that the under-seat structure of the present invention can be applied not only to motorcycles and motor-driven vehicles but also to vehicles including a seat exposed to the outside such as vehicles for traveling on an irregular ground, golf carts, and industrial machines, agricultural machinery, civil engineering machines, and construction machines.

As described above with reference to FIGS. 1, 8, 15 to 18(a) and 18(b), according to the present invention, a motor-driven vehicle 10 is provided wherein a rear wheel 23 is driven by a motor 100 to which power is supplied from a battery 18 and a voltage of the battery 18 is converted by a charging and voltage conversion section 25 to supply power to electrical equipment such as a tail lamp 26. The motor-driven vehicle 10 has the charging and voltage conversion section 25 attached to a vehicle body frame 11 or an intermediate frame 64 in an exposed state.

Since the charging and voltage conversion apparatus 25 is in an exposed state, when compared with an alternative arrangement wherein the voltage conversion section is provided, for example, in the body cover, heat generated in the charging and voltage conversion apparatus 25 can be radiated readily. Thus, a temperature rise of the charging and voltage conversion apparatus 25 can be suppressed.

Further, since the charging and voltage conversion apparatus 25 is in an exposed state, the assembly and maintenance thereof are facilitated, and the assembling property and the maintenance property can be improved.

According to the present invention, the motor-driven vehicle 10 includes a seat 27 that is attached to an upper portion of a vehicle body frame 11. More particularly, to a seat post 21, such that an article accommodating space 234 is provided below the seat 27, and the charging and voltage conversion section 25 is disposed in the article accommodating space 234.

Thanks to the article accommodating space 234 below the seat 27, the charging and voltage conversion section 25 is likely to be exposed to operating wind. Consequently, the charging and voltage conversion section 25 can be cooled effectively with the operating wind.

Further, since the article accommodating space 234 below the seat 27 is utilized to dispose the charging and voltage conversion section 25, the space of the vehicle body can be utilized effectively.

According to the present invention, the motor-driven vehicle 10 includes the charging and voltage conversion section 25 and the tail lamp 26 that are disposed closely to each other.

Since the charging and voltage conversion section 25 and the tail lamp 26 are disposed closely to each other, the distance over which the charging and voltage conversion section 25 and the tail lamp 26 are connected to each other by leads 243, 243 can be made short, and electric influences such as the loss by the resistance and noise can be reduced.

According to the present invention, the motor-driven vehicle 10 includes fifth cooling fins 238, . . . that are provided on the charging and voltage conversion section 25 in such a manner as to extend downwardly.

Since the fifth cooling fins 238, . . . are provided on the charging and voltage conversion section 25 in such a manner as to extend downwardly, the cooling efficiency of the charging and voltage conversion section 25 can be improved. Further, according to the present invention, rainwater or dust can be prevented from collecting between the cooling fins in a case wherein the cooling fins are provided, for example, at an upper portion of the voltage conversion section.

It is to be noted that, while, in the present invention, the cooling fins of the voltage conversion section are formed so as to extend downwardly, the direction in which the cooling fins extend is not limited to this, and the cooling fins may be formed on a side face of the voltage conversion in such a manner as to project sidewardly of the vehicle body.

It is to be noted that, while, in the present invention, the charging cable is disposed in the hollow portion in the seat post, the location in which the charging cable is disposed is not limited to this location. A hollow portion may otherwise be provided in the intermediate frame such that the charging cable is disposed in the hollow portion. At this time, the opening of the hollow portion may be covered with a part of the tail lamp.

Since the present invention has the configuration described above, the following effects are exhibited.

The under-seat structure for a motorcycle according to the present invention provides a seat frame that is covered with the seat as viewed from above and is structured so as to hold an article in an exposed state thereon. Thus, an article can be accommodated immediately below the seat. Consequently, the article accommodated in the article accommodating space does not become wet with rain even if a cover or the like is not provided transversely of the article accommodating space. Therefore, the necessity for a special structure for preventing an article accommodated in the article accommodating space from becoming wet with rain is eliminated. In addition to the structure described, since the under-seat structure is a simple structure that the seat frame and the seat are attached to the seat post, the number of parts can be reduced to permit a reduction in the weight.

Further, where the article is, for example, a helmet, if the helmet is retained on the seat frame, then a novel appearance can be obtained wherein at a glance it does not appear that a helmet is accommodated below the seat. Consequently, the charm of the structure can be improved to further improve the marketability of the motorcycle.

Furthermore, if the seat is formed as a seat of an opening and closing type, then if the seat is opened, then the helmet can be simply taken out to improve the convenience in use when an article is accommodated therein.

With the under-seat structure for a motorcycle according to the present invention, a charger for charging a battery is disposed at a lower portion of the article accommodating space and is attached to the seat post through a supporting member. A charging cable is provided for energizing the charger that is disposed in the seat post such that an end thereof can be taken out from an upper end of the seat post. Consequently, since the charger and the charging cable are disposed in dead spaces, which appear around the seat post and in the inside of the seat post, the space of the motorcycle can be utilized effectively.

With the under-seat structure for a motorcycle according to the present invention, the charger is disposed close to the seat post. Consequently, the charging cable can be formed with a reduced length to reduce the weight.

With the motor-driven vehicle according to the present invention, since the voltage conversion section is attached in an exposing state, for example, when compared with an alternative motor-driven vehicle wherein a voltage conversion section is provided in a vehicle body cover, heat generated by the voltage conversion section can be radiated readily to suppress a temperature rise of the voltage conversion section.

Further, since the voltage conversion apparatus is in an exposed state, the assembly and maintenance thereof are facilitated. Thus, the assembling property and the maintenance property can be improved.

With the motor-driven vehicle according to the present invention, a seat is attached to an upper portion of a vehicle body frame such that an exposed space is provided below the seat and the voltage conversion section is disposed in the space. Therefore, in view of the space below the seat, the voltage conversion section is likely to be exposed to operating wind. Consequently, the voltage conversion section can be cooled effectively with the operating wind.

Further, since the space below the seat is utilized to dispose the voltage conversion section, the space of the vehicle body can be utilized effectively.

With the motor-driven vehicle according to the present invention, the voltage conversion section and the electric equipment are disposed close to each other. Consequently, the distance over which the voltage conversion section and the electrical equipment are connected to each other by a lead can be made short. Thus, electric influences such as a loss by the resistance and noise can be reduced.

With the motor-driven vehicle according to the present invention, cooling fins are provided on the voltage conversion section in such a manner as to extend downwardly. Therefore, the cooling efficiency of the voltage conversion section can be improved. Further, according to the present invention, rainwater or dust can be prevented from collecting between cooling fins as in a case wherein such cooling fins are provided, for example, at an upper portion of the voltage conversion section.

With the motor-driven vehicle according to the present invention, since the charging cable is disposed in the hollow portion of the vehicle body frame, there is no necessity to provide a member specially for accommodating the charging cable. In addition, a dead space in the vehicle body frame can be utilized effectively. Accordingly, compaction and miniaturization of the motor-driven vehicle can be anticipated.

With the motor-driven vehicle according to the present invention, the charging cable is accommodated in a seat post which is part of the vehicle body frame, and an opening for taking out the charging cable therethrough is provided at an upper end of the seat post and a seat is attached for opening and closing movement to the upper end of the seat post such that the opening is closed up with the seat in the closed state. Consequently, the charging cable and the opening of the seat post can be covered with the seat, and there is no possibility that the charging cable may become wet or rainwater may enter the opening. Further, since the opening is provided at the upper end of the seat post, it is easy to take out the charging cable upwardly. Furthermore, since the seat can be used commonly as lids for the accommodating space formed below the seat and for the taking out port for the charging cable, there is an effect that the number of parts is reduced to reduce the cost.

With the motor-driven vehicle according to the present invention, the charger is disposed closely to the seat post. Consequently, the charging cable can be formed short, and reduction in weight can be anticipated. Further, since the electric resistance of the charging cable is reduced, there is an effect wherein the charging efficiency is improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An under-seat structure for a motorcycle comprising:
a seat frame operatively attached to a seat post; and
a seat operatively attached to said seat frame;
wherein said seat frame is covered with said seat as viewed from above and is structured for holding an article in an exposed state on said seat frame thereby to form an article accommodating space below said seat, and wherein said seat frame is formed in circular shape or an elliptical shape for supporting an edge of a helmet from an inner edge of the seat frame, wherein a charger for charging a battery is disposed at a lower portion of said article accommodating space and is attached to said seat post through a supporting member, and a charging cable is provided for energizing said charger, said charging cable is disposed in said seat post such that an end of said charging cable can be taken out from an upper end of said seat post.

2. The under-seat structure for a motorcycle according to claim 1, wherein said charger is disposed closely to said seat post.

3. The under-seat structure for a motorcycle according to claim 1, wherein said supporting member extends a predetermined distance from said seat post for mounting said charger and said supporting member is spaced a predetermined distance from said seat for mounting an article therebetween.

4. The under-seat structure for a motorcycle according to claim 1, wherein said seat frame includes a lower surface with a plurality of hooks extending downwardly therefrom for mounting an article relative to said seat frame.

5. The under-seat structure for a motorcycle according to claim 1, wherein said seat is movable from a substantially horizontal position during normal use to an open position, said charging cable being accessible when said seat is moved to the open position.

6. A motor-driven vehicle comprising:
a vehicle body frame including a seat post;
a wheel operatively connected to said frame and being driven by a motor to which power is supplied from a battery and a voltage of the battery is converted by a voltage conversion section to supply power to electrical equipment;
a supporting member extending rearwardly from an intermediate portion of the seat post,
said voltage conversion section being attached to said supporting member in an exposed state,
wherein a charger for charging a battery is disposed at a lower portion of said article accommodating space and is attached to said seat post through a supporting member, and a charging cable is provided for energizing said charger, said charging cable is disposed in said seat post such that an end of said charging cable can be taken out from an upper end of said seat post.

7. The motor-driven vehicle according to claim 6, wherein a seat is attached to an upper portion of the seat post such that an exposed space is provided below said seat and said voltage conversion section is disposed in the exposed space.

8. The motor-driven vehicle according to claim 6, wherein said voltage conversion section and said electrical equipment are disposed close to each other.

9. The motor-driven vehicle according to claim 7, wherein said voltage conversion section and said electric equipment are disposed close to each other.

10. The motor-driven vehicle according to claim 6, wherein cooling fins are provided on said voltage conversion section, said cooling fins extending downwardly from the voltage conversion section, and along outer side faces of the supporting member.

11. The motor-driven vehicle according to claim 7, wherein cooling fins are provided on said voltage conversion section, said cooling fins extending downwardly from the voltage conversion section, and along outer side faces of the supporting member.

12. The motor-driven vehicle according to claim 8, wherein cooling fins are provided on said voltage conversion section, said cooling fins extending downwardly therefrom.

13. The motor-driven vehicle according to claim 9, wherein cooling fins are provided on said voltage conversion section, said cooling fins extending downwardly therefrom.

14. The under-seat structure for a motorcycle according to claim 6, wherein said supporting member is spaced a predetermined distance from a seat for mounting an article therebetween.

15. The under-seat structure for a motorcycle according to claim 6, wherein a seat is movable from a substantially horizontal position during normal use to an open position, a charging cable for said battery being accessible when said seat is moved to the open position.

16. A motor-driven vehicle comprising:
a battery for supplying power to a motor;
a charger for charging said battery; and
a charging cable for energizing said charger, said charging cable is disposed in a hollow portion of a seat post of a vehicle body frame of said motor-driven vehicle; and
an opening of the seat post for taking out said charging cable therethrough provided at an upper end of said seat post; and
a seat attached to the upper end of seat post for opening and closing movement, such that said opening is covered with said seat in the closed state.

17. The motor-driven vehicle according to claim 16, wherein said charger is disposed close to said seat post.

18. The under-seat structure for a motorcycle according to claim 16, wherein a supporting member extends a predetermined distance from the vehicle body frame for mounting said charger and said supporting member is spaced a predetermined distance from a seat for mounting an article therebetween.

* * * * *